United States Patent
Morrisroe et al.

(10) Patent No.: US 11,468,224 B2
(45) Date of Patent: Oct. 11, 2022

(54) METHOD FOR RESIZING ELEMENTS OF A DOCUMENT

(71) Applicant: IT Cadre, LLC, Ashburn, VA (US)

(72) Inventors: Michael Morrisroe, Ashburn, VA (US); Robert James Whyley, Haymarket, VA (US); Charles Scott Coffey, Lorton, VA (US)

(73) Assignee: IT Cadre, LLC, Ashburn, VA (US)

( * ) Notice: Subject to any disclaimer, the term of this patent is extended or adjusted under 35 U.S.C. 154(b) by 0 days.

(21) Appl. No.: 17/302,954

(22) Filed: May 17, 2021

(65) Prior Publication Data
US 2022/0050953 A1  Feb. 17, 2022

Related U.S. Application Data

(60) Provisional application No. 62/706,437, filed on Aug. 17, 2020.

(51) Int. Cl.
*G06F 40/106*  (2020.01)
*G06F 40/109*  (2020.01)
*G06T 3/40*  (2006.01)

(52) U.S. Cl.
CPC .......... *G06F 40/106* (2020.01); *G06F 40/109* (2020.01); *G06T 3/40* (2013.01)

(58) Field of Classification Search
CPC ........ G06F 40/106; G06F 40/109; G06T 3/40
USPC ....................................................... 715/252
See application file for complete search history.

(56) References Cited

U.S. PATENT DOCUMENTS

| | | | |
|---|---|---|---|
| 5,943,679 A * | 8/1999 | Niles .................. | G09G 5/39 715/247 |
| 7,222,306 B2 | 5/2007 | Kaasila et al. | |
| 7,590,947 B1 | 9/2009 | Gay et al. | |
| 7,657,573 B1 * | 2/2010 | Hancsarik .......... | G06F 9/541 707/809 |
| 7,684,640 B2 * | 3/2010 | Zhao .................. | G06T 3/40 382/274 |
| 8,917,329 B1 * | 12/2014 | Woodman .......... | G06T 3/4069 348/222.1 |
| 9,230,298 B2 * | 1/2016 | Kunigita ............ | G06F 3/0481 |
| 9,449,126 B1 * | 9/2016 | Genoni .............. | G06F 30/331 |
| 9,710,883 B2 | 7/2017 | Parag et al. | |
| 9,710,884 B2 | 7/2017 | Parag et al. | |
| 9,996,898 B2 | 6/2018 | Parag et al. | |
| 10,460,023 B1 * | 10/2019 | Shriver ............... | G06F 3/0482 |
| 10,475,160 B1 * | 11/2019 | Conroy .............. | G06T 3/4038 |
| 10,540,744 B2 | 1/2020 | Parag et al. | |
| 11,132,494 B2 * | 9/2021 | Milas ................. | G06T 13/80 |
| 2005/0049884 A1 * | 3/2005 | Hunt .................. | G06F 3/0644 718/104 |

(Continued)

*Primary Examiner* — Andrew R Dyer
(74) *Attorney, Agent, or Firm* — Dunlap Bennett & Ludwig, PLLC

(57) ABSTRACT

A method for displaying digitized documents in a non-proportional manner that retains the overall context while emphasizing high value information is provided. The method includes determining useful increment for scaling objects of digital content as a function of their value and their prominence and proximity to other objects. The font size of high-value text elements for containers may be increased and the container themselves may be vertically scaled and shifted in a non-proportional manner.

31 Claims, 26 Drawing Sheets

(56) References Cited

U.S. PATENT DOCUMENTS

| | | | |
|---|---|---|---|
| 2005/0094205 A1* | 5/2005 | Lo | G06F 40/106 358/1.18 |
| 2005/0108656 A1 | 5/2005 | Wu et al. | |
| 2006/0117255 A1* | 6/2006 | Seeler | G06F 40/106 715/246 |
| 2007/0113175 A1* | 5/2007 | Iwasaki | G06F 40/106 715/246 |
| 2007/0126793 A1* | 6/2007 | Yamakado | G06F 40/186 347/43 |
| 2007/0208996 A1* | 9/2007 | Berkner | G06F 40/106 715/210 |
| 2008/0033996 A1* | 2/2008 | Kesari | G06F 16/951 |
| 2010/0138778 A1* | 6/2010 | Dewan | G06F 9/451 715/789 |
| 2011/0099494 A1* | 4/2011 | Yan | G06T 11/206 715/765 |
| 2011/0273470 A1* | 11/2011 | Ohba | G06T 3/40 345/619 |
| 2012/0045147 A1* | 2/2012 | Liu | G06T 3/40 382/282 |
| 2013/0120462 A1* | 5/2013 | Shuler | G06F 3/1423 345/660 |
| 2014/0118405 A1* | 5/2014 | Chand | G06F 16/9537 345/661 |
| 2014/0289614 A1* | 9/2014 | Ayers | G06F 3/04845 715/247 |
| 2014/0372870 A1* | 12/2014 | Chen | G06F 3/0484 715/234 |
| 2015/0062182 A1* | 3/2015 | Dow | G06T 1/60 345/660 |
| 2015/0331962 A1* | 11/2015 | Liang | G06F 40/109 715/249 |
| 2016/0092091 A1* | 3/2016 | Hanson | G06F 3/04886 715/763 |
| 2016/0179757 A1* | 6/2016 | Nickolov | G06F 40/151 715/273 |
| 2016/0275054 A1* | 9/2016 | Liang | G06F 40/143 |
| 2017/0084003 A1 | 3/2017 | Parag et al. | |
| 2018/0113576 A1* | 4/2018 | Bauchot | G06F 40/166 |
| 2018/0307754 A1* | 10/2018 | Somlai-Fischer | G06T 3/40 |
| 2019/0026011 A1 | 1/2019 | Wang et al. | |
| 2019/0066261 A1* | 2/2019 | Ma | H04L 51/08 |
| 2020/0258204 A1* | 8/2020 | Fang | G06T 3/0012 |
| 2020/0387566 A1* | 12/2020 | Venkateshaiah | G06F 40/197 |

\* cited by examiner

METHOD FOR RESIZING ELEMENTS OF A DOCUMENT

CROSS-REFERENCE TO RELATED APPLICATION

This application claims the benefit of priority of U.S. provisional application No. 62/706,437 filed 17 Aug. 2020, the contents of which are herein incorporated by reference.

BACKGROUND OF THE INVENTION

The present invention relates to methods and systems of displaying digital content and, more particularly, a process for displaying digitized documents in a non-proportional manner that retains the overall context while emphasizing high value information.

Prior methods for displaying digitized documents on a display area smaller than the original document rely on proportionally reducing the size of every item of each document, rendering the digital content impossible to read when the entirety of the digitized document is displayed on a display area/screen smaller than the original document. Prior methods focus on proportional formatting and sizing of digital content, thereby failing to consider the relative value of different elements of the original document. For instance, digital content providing a plurality of diagrams would require separately adjusting the scales of each diagram—a manually intensive time-consuming process—or else provide the above-mentioned proportional representation of the plurality of diagrams that is either unreadable and/or obscures the overall context or the otherwise perceivable organized whole of the sum of the diagrams.

As can be seen, there is a need for a method of non-proportional formatting of digital content on a display screen size that is exceeded by the original size of the digital content.

The process embodied in the present invention is adapted to accentuate higher-value features of digital content (diagrams, documents, engineering products, pictures, etc.), thereby retaining the meaningfulness of the entire context while reducing the scale of underlying or low-value components yet keeping the overall form of the digital content. This method preserves the context of the sum of the digital content while providing higher readability to higher value items and components that inform the reader's understanding of the organized whole of the sum of the digital content—i.e., "the big picture". Thereby the digital context is legible in its entire context, overcoming the disadvantages of the prior art where users were forced to choose between either seeing the entire document or being able to read and understand valuable content in the document.

SUMMARY OF THE INVENTION

In one aspect of the present invention, a computer implemented method of processing a visual display containing a nesting of process levels, wherein respective process levels contain one or more visual elements, wherein each visual element comprises a graphic element and a text element, the method including linearly resizing one or more graphic elements on a respective process level of the nesting of process levels as a function of a sum of text element adjustments at successively inner process levels of the nesting of process levels.

In another aspect of the present invention, the method includes wherein each text element adjustment is adjusted as a function of the respective process level relative to a hierarchy of the nesting of process levels, wherein each visual element has a zoomable data set comprising: a container height, a container width, and a container center, wherein linearity is consistently associated with the container height or the container width of the respective visual element, wherein each sum of text element adjustments is a function of one or more stack reserves, wherein each stack reserve is defined by a stack of linear graphic elements on a respective process level, wherein the linear resizing of each graphic element, at each respective process level, is a function of a largest stack reserve of the one or more stack reserves of an immediately outer process level; and further proportionally resizing each graphic element within each stack as a function of a difference between the largest stack reserve and the stack reserve associated with said stack; and further resizing graphic elements in such a way that adjacent graphic elements maintain a native relationship of the visual display, wherein the native relationship is defined, in part, at each process level, by a linear adjacency of each graphic element associated with the largest stack reserve and a graphic element associated with each remaining stack reserves, respectively; and further linearly shifting, at each process level, a most linearly advanced graphic element associated with the largest stack reserve as a function of an immediately outer processing level; and linearly shifting, at each process level, the remaining graphic elements associated with the largest stack reserve as a function of an immediately linearly advanced graphic element or linearly shifting, at each process level, the graphic elements associated with a stack reserve less than the largest stack reserve as a function of the linear adjacency, wherein each linear shift of each graphic element is defined by the container center of said graphic element, wherein each linear shift is a center-y or center-x shift; and further accessing a set of one or more data files specifying the zoomable data set; and storing one of a different non-proportional zoomable data sets for different visual elements of the plurality of visual elements, wherein the non-proportional zoomable data set refines the zoomable data set, respectively, wherein each stored non-proportional zoomable data set is stored with each respective visual element; and rendering the visual display on a display screen by modifying each visual element according to the stored non-proportional zoomable data sets, wherein each text element comprises a font size, and wherein, for each text element, the text element adjustment comprises an adjustment to said font size.

In yet another aspect of the present invention, a computer implemented method of processing a visual display containing a nesting of process levels, wherein respective process levels contain one or more visual elements, wherein each visual element comprises a graphic element and a text element, the method including: incrementally resizing a font size of each text element as a function of a sum of text element adjustments at successively inner process levels of the nesting of process levels.

In yet another aspect of the present invention, a method of resizing a source document comprising a visual display containing a nesting of process levels, using the above-mentioned method, wherein respective process levels contain one or more visual elements, wherein each visual element comprises a graphic element and a text element, the method including receiving a request to display, on a display screen, the source document in a zoom representation of the source document; generating the zoom representation through accessing the non-proportional zoomable data sets stored in each visual element; and displaying the generated zoom representation within the display screen. In yet another aspect of the present invention, a method of resizing a source document comprising a visual display containing a nesting of process levels, using the method of claim 18, wherein respective process levels contain one or more visual elements, wherein each visual element comprises a graphic element and a text element, the method includes: receiving a request to display, on a display screen, the source document in a zoom representation of the source document; generating the zoom representation through accessing the non-proportional zoomable data sets stored in each visual element; and displaying the generated zoom representation within the display screen. These and other features, aspects and advantages of the present invention will become better understood with reference to the following drawings, description and claims.

BRIEF DESCRIPTION OF THE DRAWINGS

In FIG. 2A, a document or diagram modified using normal, native, or inherent zoom can leave most of the diagram illegible as well as leaving a lot of white space on the page to keep the dimensions of all objects proportional. In comparison, the diagram of FIG. 2B, modified using non-proportional zoom, is more legible than FIG. 2A, whereby in this embodiment the diagram may be expanded unidirectionally (here, vertically from top to bottom) to create enough room for the headings to be expanded without making any changes to the left and right (horizontal) dimensions. Also, only the items that need to be accentuated ("high-value containers") are, while other items, like "B", retain their original size;

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Referring now to FIG. 1 through FIG. 6M, the present invention may include a method that improves the technology of displaying digital content. The present invention embodies a non-proportional zoom process that displays objects of an original document in such a manner as to retain the shape and form of the objects and that overall structure of the original document, through displaying lower value elements at a reduced level of detail, while simultaneously increasing the high value elements that provide contextual meaning to the organized whole of the sum of the diagram(s), picture(s) and/or document(s) of the original document.

For example, the present invention can be included in a viewer for displaying large Visualization Engineering® diagrams. These diagrams are typically 3½ feet by 12 feet when printed. Of course, there are other documents, from many engineering fields, whose perimetrical dimensions far exceed that of a 33-inch monitor. The viewer's purpose includes a mechanism to share these large diagrams electronically. The inventor found that putting diagrams directly on a conventionally sized screen and using normal zoom techniques ("native" or "inherent zoom") alone rendered the diagrams useless because one could not both see the overall context and read the high-value detail.

In contrast, the non-proportional zoom functionality of the present invention may be configured to treat different digital diagrams (within the same document) and diagrammatical elements differently. The non-proportional zoom accentuates high-value features when the digital content is zoomed out in such a way that the accentuated features inform the viewer of the valuable context of the digital content. In short, the non-proportional zoom processing embodiment in the present invention makes the information of the digital content usable at all levels of zoom.

An original document suitable for the present invention typically has a plurality of containers, wherein many of these containers each have a plurality of nested containers.

The original document has an original document width and an original document height, and each container has an original container width and an original container height.

Figure 3A:
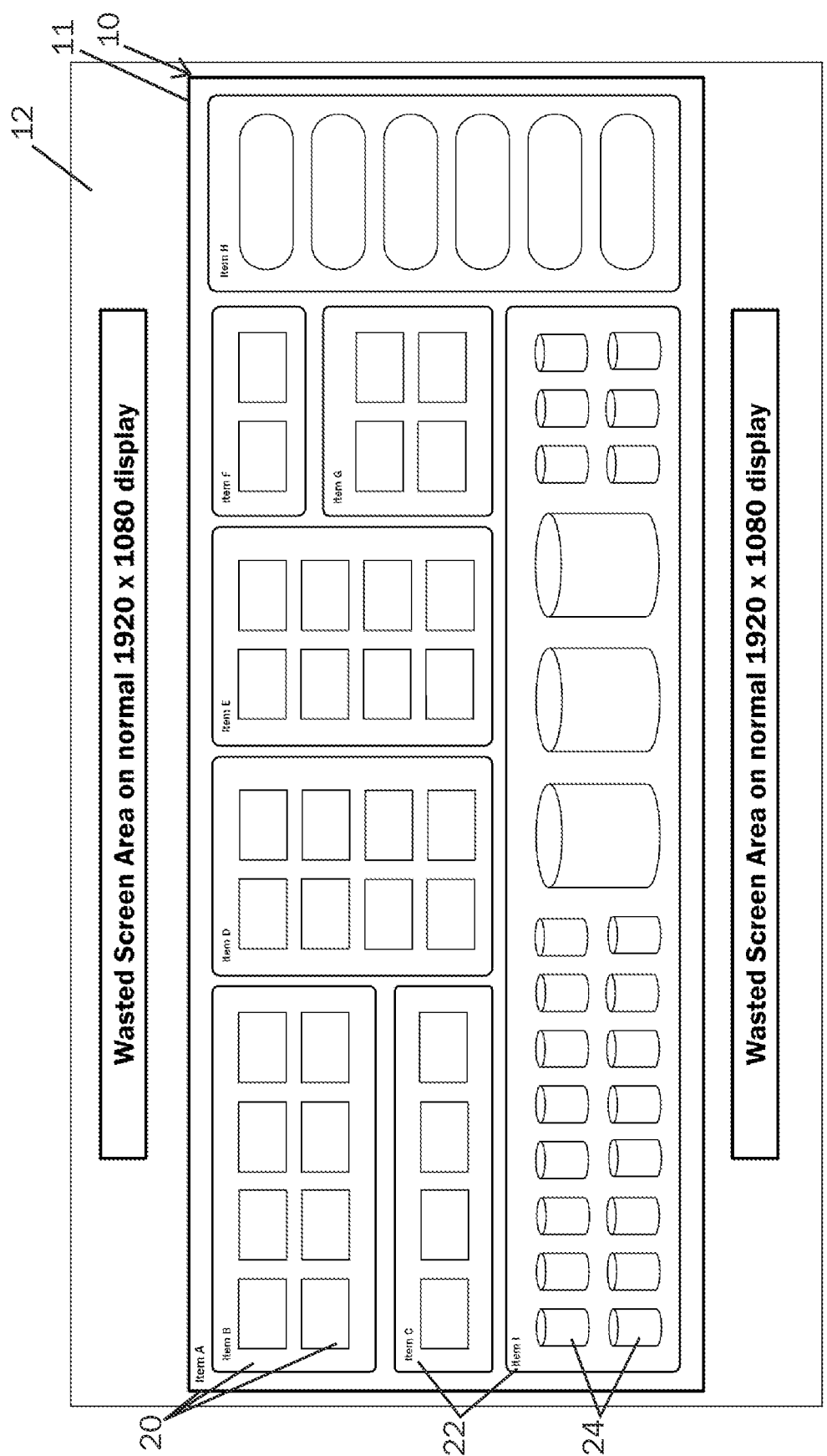
FIGS. 3A and 3B are schematic views comparing the prior art (FIG. 3A) and an exemplary embodiment of the present invention (FIG. 3B), illustrating the maximization of display space captured by the present invention.
Figure 3B:
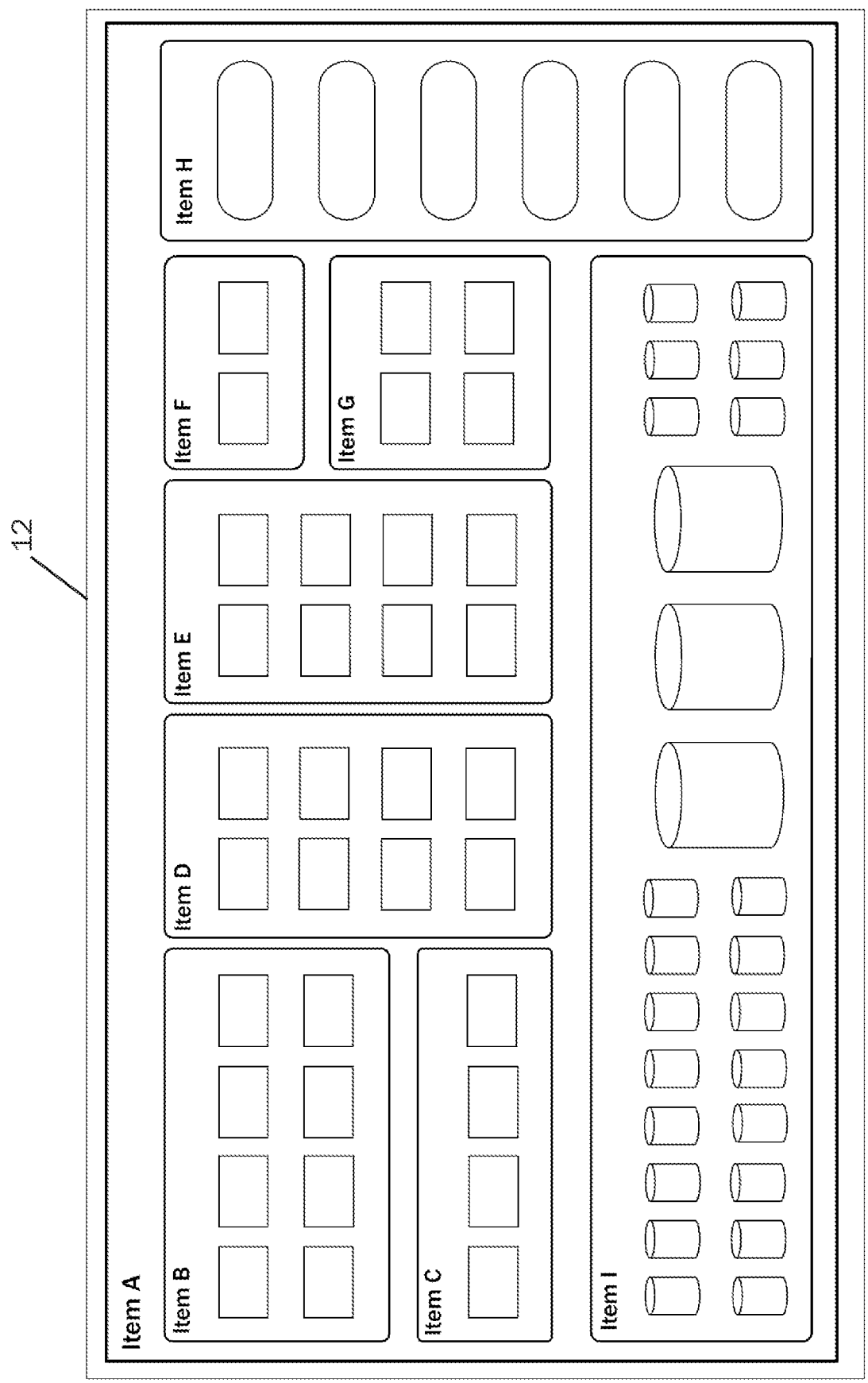

Upon importation into a computing device with a display device, the original document width is most likely configured by the inherent or native zoom so that the original document's width generally corresponds with the width of the selected display screen 12. As a result, the original widths of each respective container are proportional changed (to accommodate the change in the original document width) to native widths. This horizontal stretching results in wasted screen area, or "dead area", between the now "native document" and the display screen 12, as depicted in FIG. 3A.

It should be understood that, though the embodiments disclosed herein apply to an original document having an aspect ratio x:y (x units wide and y units high) wherein x>y so that the original document extends a greater amount of units along the horizontal axis than units it extends along the vertical axis, the present invention is applicable for original documents having an aspect ratio, wherein x<y, whereby the scaling and stretching of the original document and its containers is done along the horizontal axis.

The present invention embodies the following non-proportional zoom method. It being understood that the below processes define exemplary pre-processing methodologies applied prior to the representation of the document on the display screen. The non-proportional zoom method includes at least a first pass component, then a second pass component, and a third pass component.

The First Pass Pre-Processing Component

Figure 1:
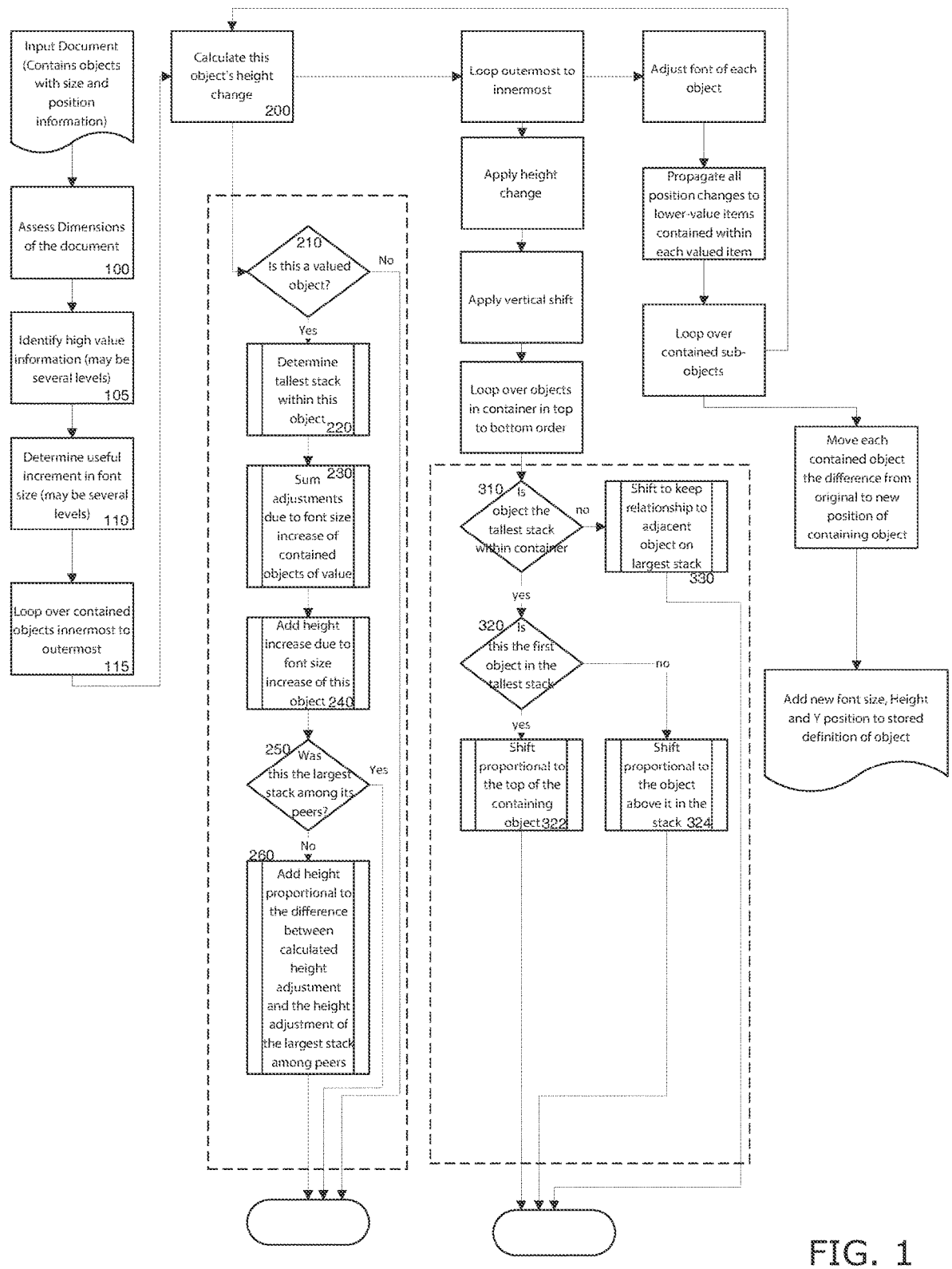
FIG. 1 is a block diagram of an exemplary embodiment of the present invention.
Figure 2A:
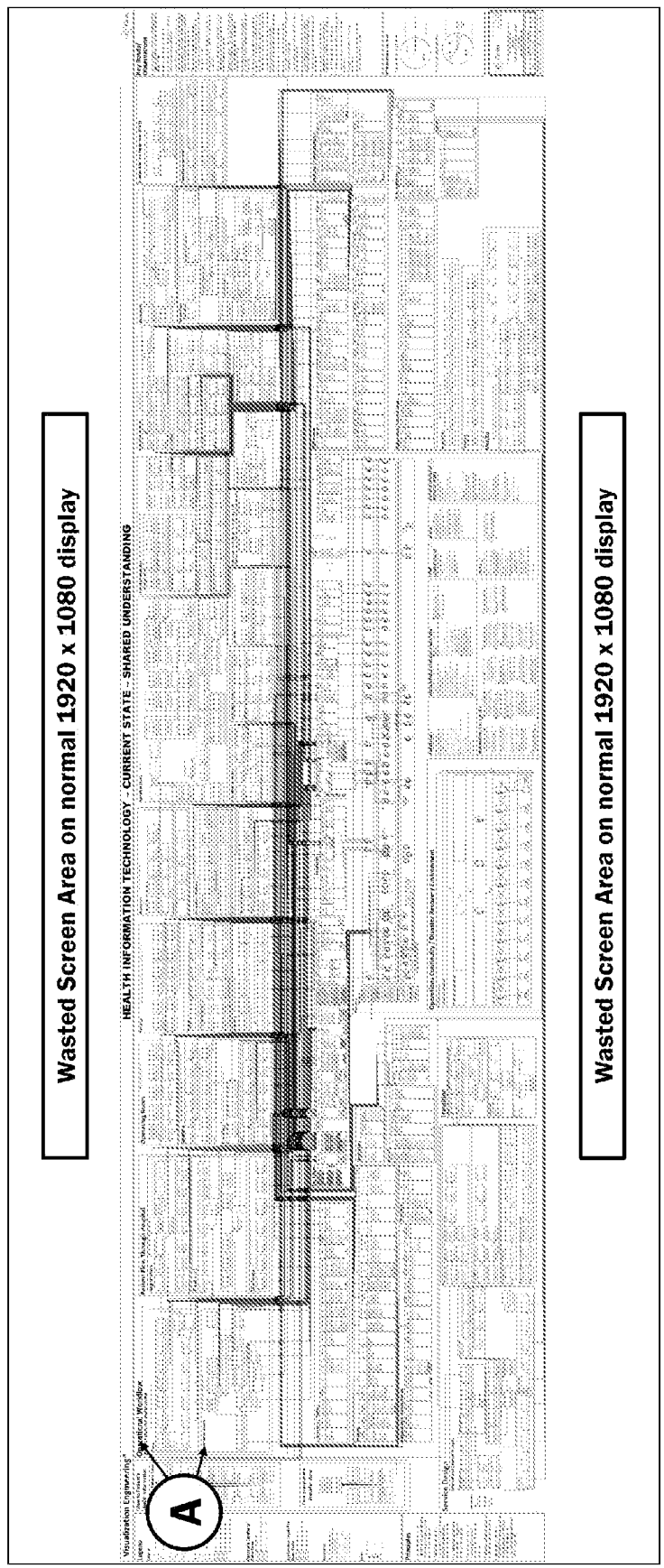
FIGS. 2A and 2B are a diagrammatical comparison of the prior art (FIG. 2A) and an exemplary embodiment of the present invention (FIG. 2B), wherein the upper diagram represents the results of a proportional zoom mode of the prior art and the lower diagram represents a non-proportional zoom mode of the same diagram through the exemplary embodiment.
Figure 2B:
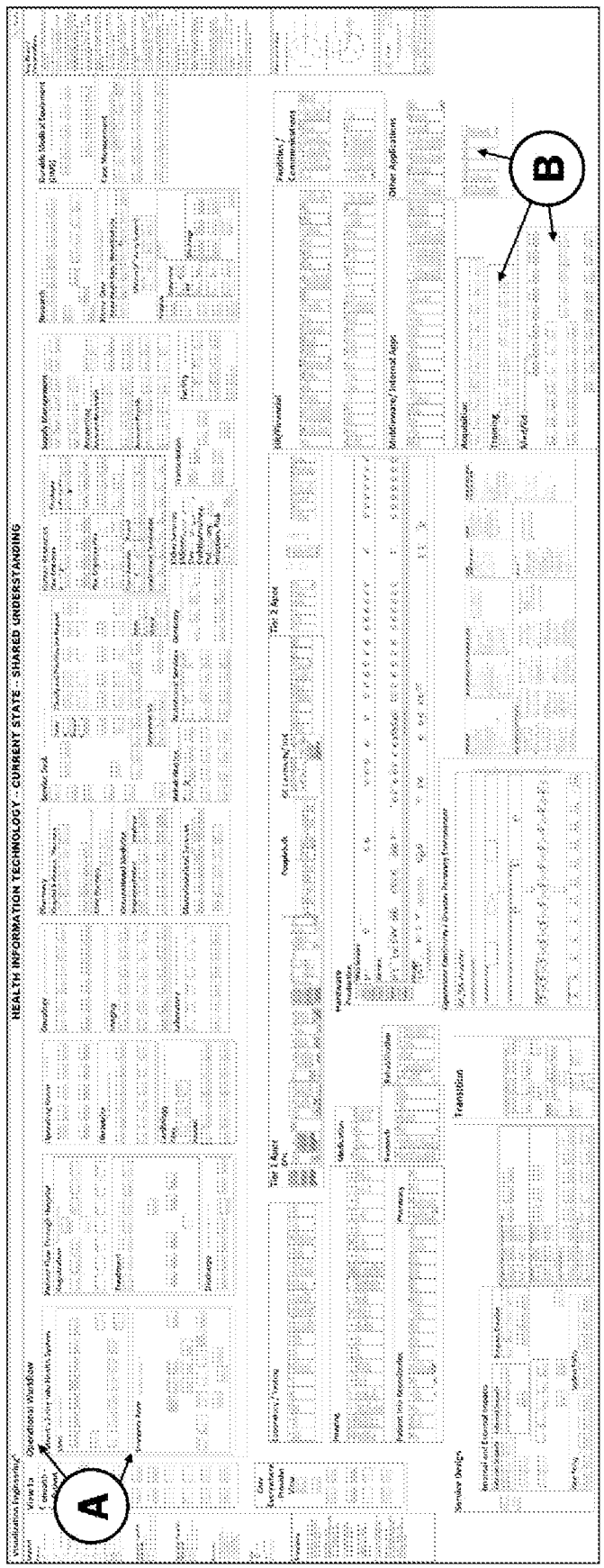

Referring to FIG. 1, the process begins with inputting into a computer with a zoomable user interface (ZUI) an original document, wherein the original or source document contains objects, and wherein size and position information is associated with each object. This original or source document is subject to an inherent or native zoom processing enabling users of the computer to change the scale of the viewed area represented on the display screen operatively associated with the computer. The native zoom processing modifies visual elements of the source document according to a set of rules that are applied to parameters of the data objects that comprise the visual elements. The visual elements may include, among other things, graphic element and text elements. The parameters may include, but are not limited to, a container height, a container width, and a container center of each graphic element and a font size and text location for each text element.

To be clear, both visual elements and text elements can be data objects that store data or "containers." Furthermore, visual elements may include graphic element data objects beyond the rectangular and circular/rectangular shapes shown in the appended Figures, and so may include any shape that is scalable or zoomable. In step 100, the present invention assesses dimensions of the native document 10 and its containers and other digital elements and data objects associated with the native document. The native document 10 is the representation of the original document in the graphical environment of the inherent or native zoom of the ZUI. To do this, the present invention embodies a coordinate system that is platform independent. The coordinate system may define the upper left corner of the native document 10 or the display screen of the graphical environment as representing (0,0) point, an origin of a horizontal axis and a vertical axis, wherein the horizontal axis increments positively to the right of the page, and wherein the vertical axis increments positively towards the bottom of the page. Other coordinate systems are possible, such as the lower left of the display screen representing (0,0), as long as the present invention functions as disclosed herein.

The dimensions of the proportionally-scaled native document 10 and its proportionally-scaled "native" containers/objects/visual elements 20 and elements contained by said containers/visual elements 20 can be determined in reference to the coordinate system. Such contained elements may include but not be limited to text elements 22 (including a text layer having text labels, text boxes, scalable font sizes, and the like) and graphic elements 24 (including graphic data objects such as pixilated images and the like). Accordingly, size data and positional data of each container 20 and container elements are identified relative to the coordinate system and thus each other, and said elemental data is linked to and stored with each respective container/visual elements 20.

At block 105, the present invention is adapted to identify "high-value" information. In certain embodiment, the high-value information may be text elements 22 associated with each container header. The container header may include a text layer that broadly textually defines for readers the contents of associated container/visual element 20.

The first pass component proceeds to block 110, where the present invention determines a useful increment in font size for each high value text element 22 (e.g., container header). The present invention can modify the text layer by, for example, changing font sizes ('font resizing') so that even the most nested high value information is readable. Modification of the text layer may also include repositioning text locations, again to make high value information readable.

Figure 4A:
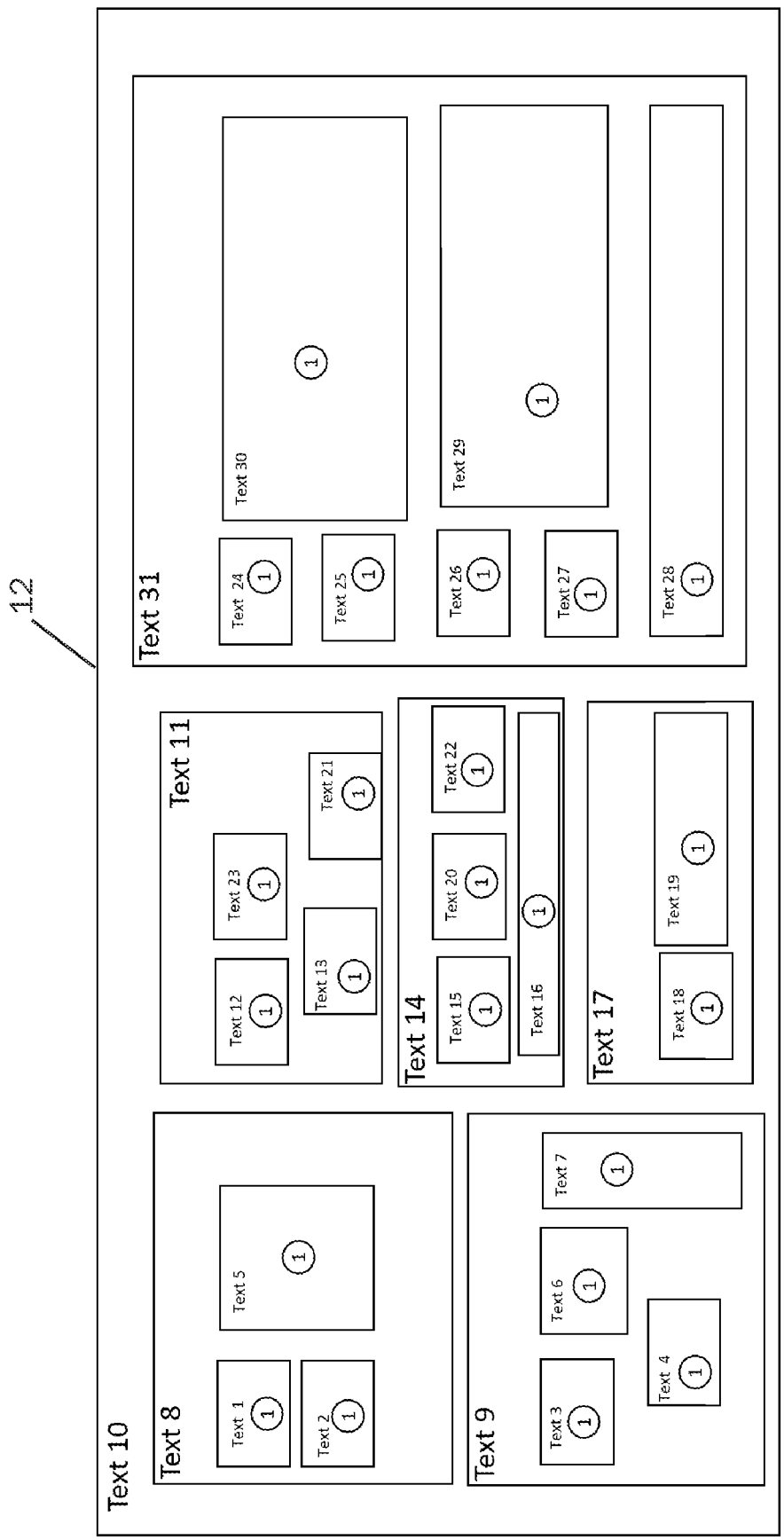
FIGS. 4A through 4E are schematic views of the pre-processing determination of the tallest stack.
Figure 4B:
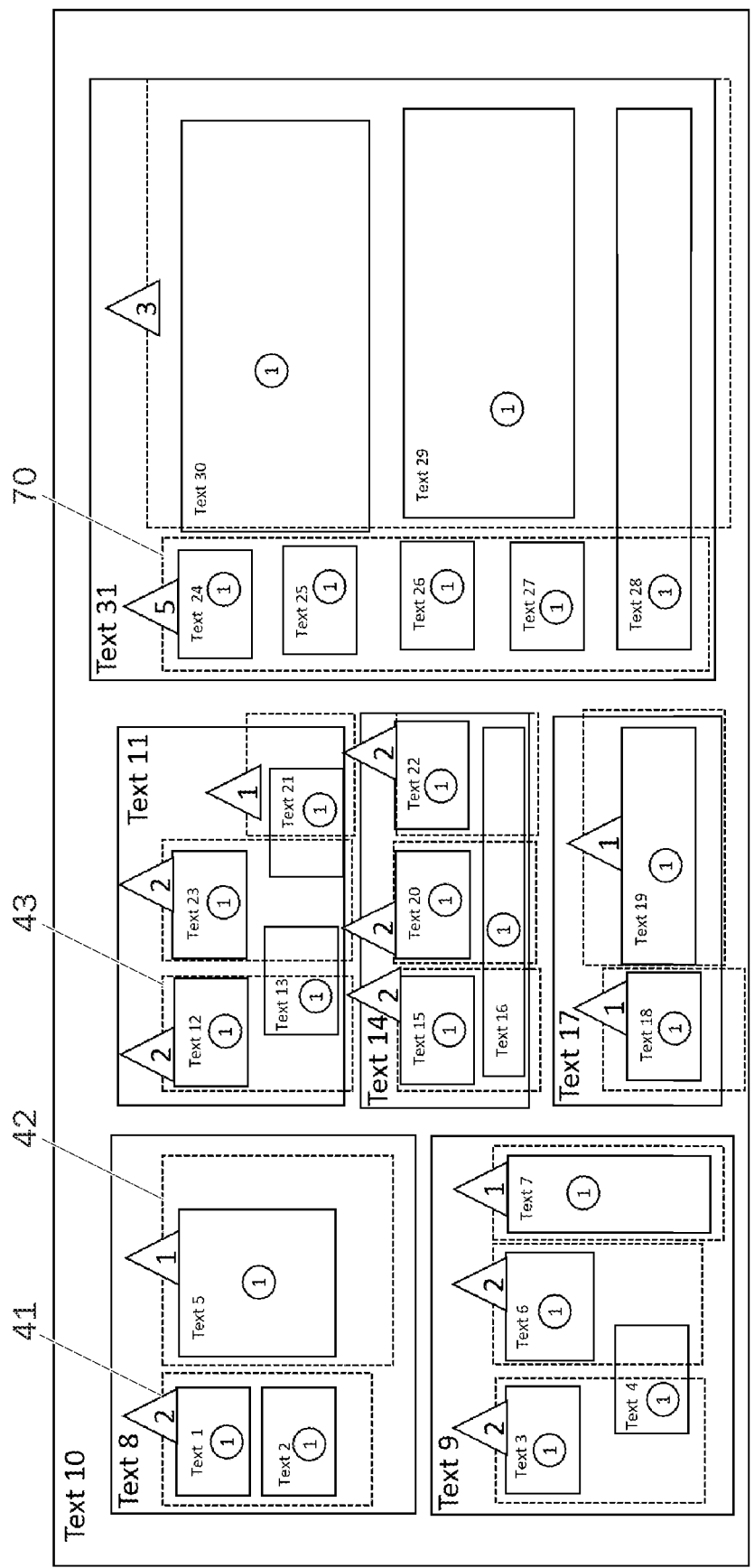

This useful increment determination is a font resizing effort contemplating high level layout considerations (e.g., including keeping text at a minimum size). Therefore, the font resizing is a function of, in part, the associated container's relative position to other containers in a stack of containers. Therefore, font resizing goes hand in hand with defining stacks of containers (or just "stacks") and the stacks' relative heights (prominence) and proximity with other stacks. Various stacks 41, 42, 43, and 70 are shown in FIG. 4B.

Thus, the present invention embodies determining a useful increment for increasing the saliency of high level (or "high value") information through iteratively determining a final font size reserve (or font size adjustment) for each stack; in other words, the final font size reserve is the sum of the instant font size reserves associated with each bounded container in the stack in question. In certain embodiments, the high value information may be associated with a 'valued object, which by definition is a visual element having both a graphic element and a text element.

As such, the first pass component proceeds to block 115, wherein the present invention loops over contained objects in an "inside out" manner to calculate this object's height change (second pass pre-processing component). It being understood that the non-proportional zoom embodied in the present invention aims to additionally retain the contextual meaningfulness of the organized whole of the sum of all the features. Accordingly, the present invention loops over contained objects nested within other containers and across of plurality of process levels in the following second and third pass pre-processing components, which are explained more below. Process levels may be conceptually akin to rendering layers associated with different aspects of a visual interface; though, again, the present invention is focused on non-proportional resizing rules during pre-processing of the visual display to be rendered.

The Second Pass Pre-Processing Component

The non-proportional zoom process proceeds to the second pass component of block 200. In step 200, each contained objects are height adjusted in accordance with the following series of queries that starts at control to block 210. At block 210, a query determines whether the object in question is a valued object. A determination that the object is valued may be made by identifying any high value information (e.g., container header) contained therein—i.e., 'valued object' contains high valued information.

If the answer to the query at block 210 is affirmative, then the second pass process moves to block 220 that determines the tallest contained stack within or bounded by this valued object through the same manner disclosed in the first pass pre-processing component for identifying stacks, and then utilizing the coordinate system to determine the tallest stack. If the answer to the query at block 210 is negative, no height adjustment is calculated for that object.

Determination of the tallest stack in block 220 first requires that stacks must be defined and identified. Referring to FIGS. 4A through 4E, a stack is defined as one or more containers disposed vertically relative to each other. Therefore, all containers in one stack share at least one point along the horizontal axis. Or in other words, all containers in one stack are intersected by a vertical line normal to said horizontal axis. This query may be determined by comparing the locations along the horizontal axis of the left and right vertical boundaries ("horizontal boundary set") of each container 20, whereby an intersection of horizontal boundary sets between containers vertically adjacent to each other defines them as a part of the same stack. In FIG. 4B, Text 1 container and Text 2 container are part of the same stack (within Text 8 container). Likewise, Text 24 through Text 28 containers are nested in one stack (within Text 31 container).

Furthermore, one container may belong to two separate stacks. For instance, in FIG. 4B, Text 28 container (within Text 31 container) is also part of a second stack, defined by Text 29 and Text 30 containers.

However, to be clear, though the height of a container is determined by using the coordinate system to evaluate the y-delta between the container's top-most edge and its bottom most edge, the term "tallest stack" is specifically understood to be a function of the final font size reserve for each of the bounded containers and not a function of native height of those bounded containers. At block 230 a height increase of the instant valued object is determined as a function of the sum or accumulation of font size increases for text elements 22 (e.g., high value information) of the tallest stack of the plurality of stacks bounded by said instant valued object.

Specifically, stacks are evaluated in an "inside out" manner, wherein there must be an innermost process level (of possibly a plurality of inner process levels) and an outermost process level, and the analysis begins at the innermost process level. In FIG. 4A, Text 10 container is at outermost process level and the Text 2 container is the innermost process level, wherein Text 8 container is an intermediate process level. The innermost container may be assigned as process level 1, the next outer container (e.g., Text 8 container) may be assigned as process level 2, and finally the Text 10 container may be assigned as process level 3.

Conceptually the nesting of process levels can be thought of as a hierarchy with process level 1 as the innermost of the hierarchy, process level 2 being immediately outer relative to level 1 in the hierarchy and so process level 1 is contained in process level 2. And any subsequent levels progressively continuing in position outward of the hierarchy (e.g., in an embodiment in which there are, e.g., a process level 3 and a process level 4, process level 3 would be outward of and contain process level 2, and process level 4 would be outward of and contain process level 3, etc.). In certain embodiments, the bounds 11 of the proportionally scaled native document 10 typically defines the outermost process level. It should be understood that in an alternative embodiment, the outermost process may be process level 1, and the immediately inner process level would be process level 2, and so on.

Illustration of the inside-out manner is found in FIG. 4A, wherein it is indicated that process level 1 Text 2 container is allotted an instant font size reserve (IFSR) of '1' (in the circle) for high-value text elements 22. Process level 2 Text 8 is allotted a IFSR of '2', twice that of process level 1's IFSR. Process level 3 Text 10 container is allotted a IFSR of '3'. Thus, IFSR is proportional or at least a function of or related to the associated process level on which the IFSR is applied.

All the IFSRs in the relevant stack are summed. For example, in FIG. 4B, the '2' (in the shaded triangle) associated with the stack comprising Text 1 and Text 2 containers is the sum of two process level 1 IFSRs of '1' associated with said Text 1 and Text 2 containers' high-value text elements 22. Note, throughout FIGS. 4B through 6M the dashed lines circumscribe identified stacks. Further note, when discussing IFSR, it will be assumed it is applied to high-value text elements 22, but it could be associated with other elements and objects found in digital documents and other digital content.

Figure 4C:
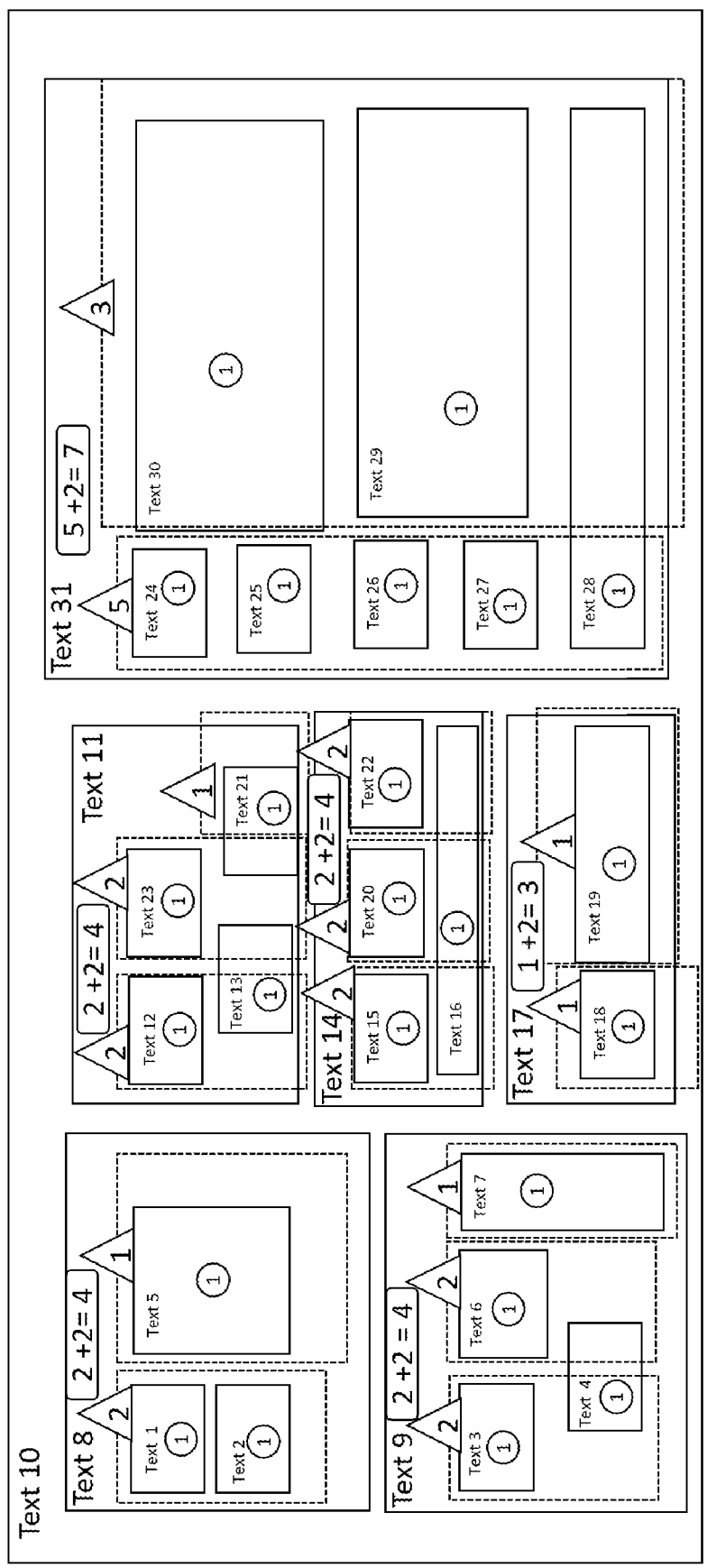

Referring to FIG. 4C, the process level 2, Text 8 container is allotted a IFSR of '4', which is a sum of its bounded containers' IFSR of '2' (Text 1 and Text 2 as determined immediately above) and the inherent IFSR of '2' associated with process level 2 (e.g., Text 8 container). A similar process is applied to process level 2 Text 9 container.

It should be understood that the IFSRs mentioned above and represented in FIGS. 4A through 4E are exemplary and unitless, and so process level 1 are not always increased by 1 "unit", but rather the IFSRs reflect a factor that produces the previously mentioned useful increment when applied to the native font size of the text element 22 of the native document 10. Units could be established by way of a coordinate system, like the one disclosed above.

Figure 4D:
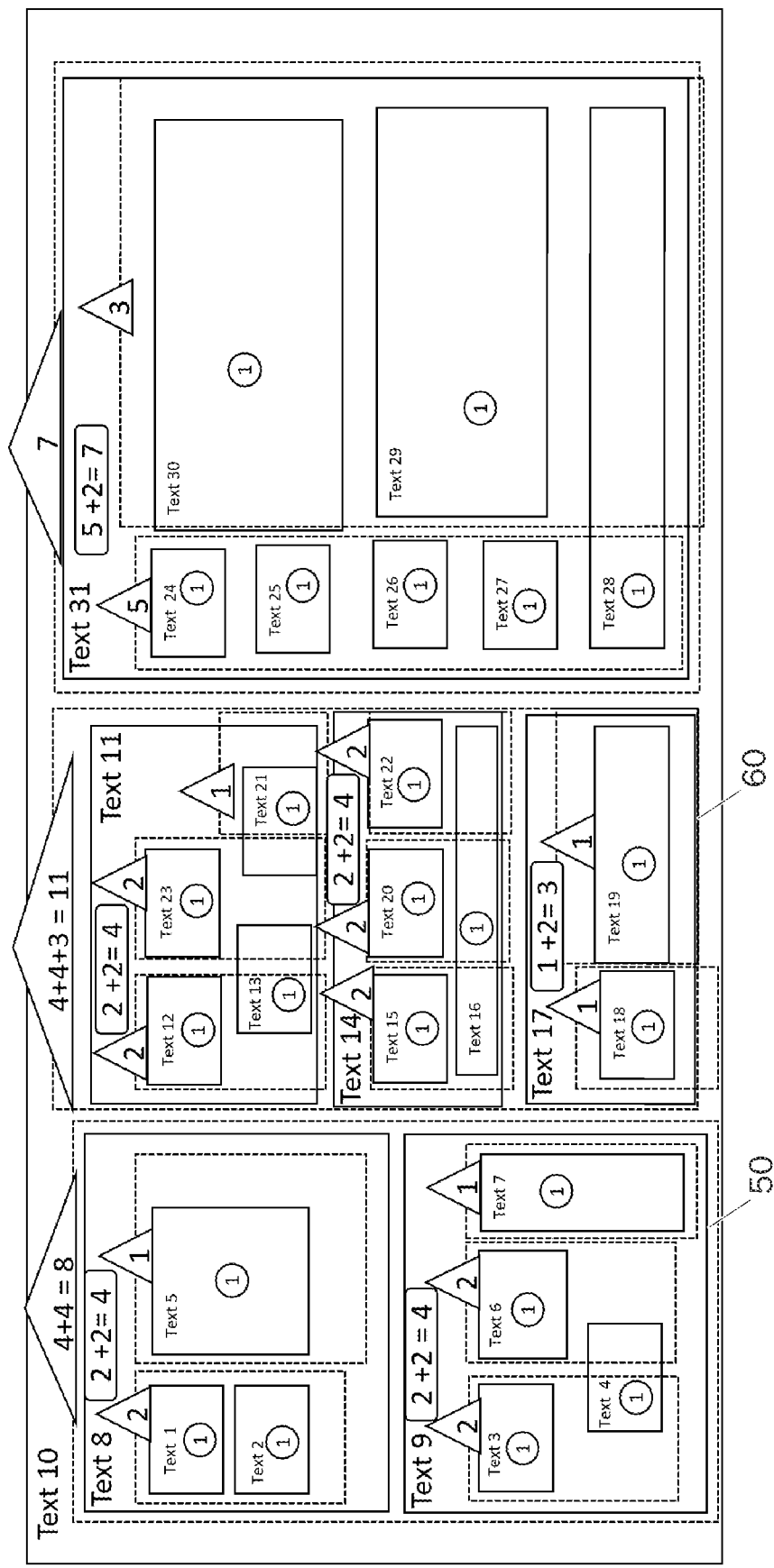

In FIG. 4D, a determination of the tallest stack can be effectuated by summing of all relevant bounded containers' IFSRs. Thus, the stack 50 that comprises Text 8 container and Text 9 container, has a final font size reserve (FFSR) of '8' (as indicated in the relevant shaded triangle) that is the sum of the IFSRs of Text 8 container and Text 9 container. Furthermore, the tallest stack 60 (in this example, comprises Text 11, Text 14, and Text 17 containers) may be determined as being associated with a summed FFSR of 11. Again, the determination of the tallest stack is not a function of the bounded containers native height, but rather the tallest stack is a function of the associated FFSR-related height increase.

Figure 4E:
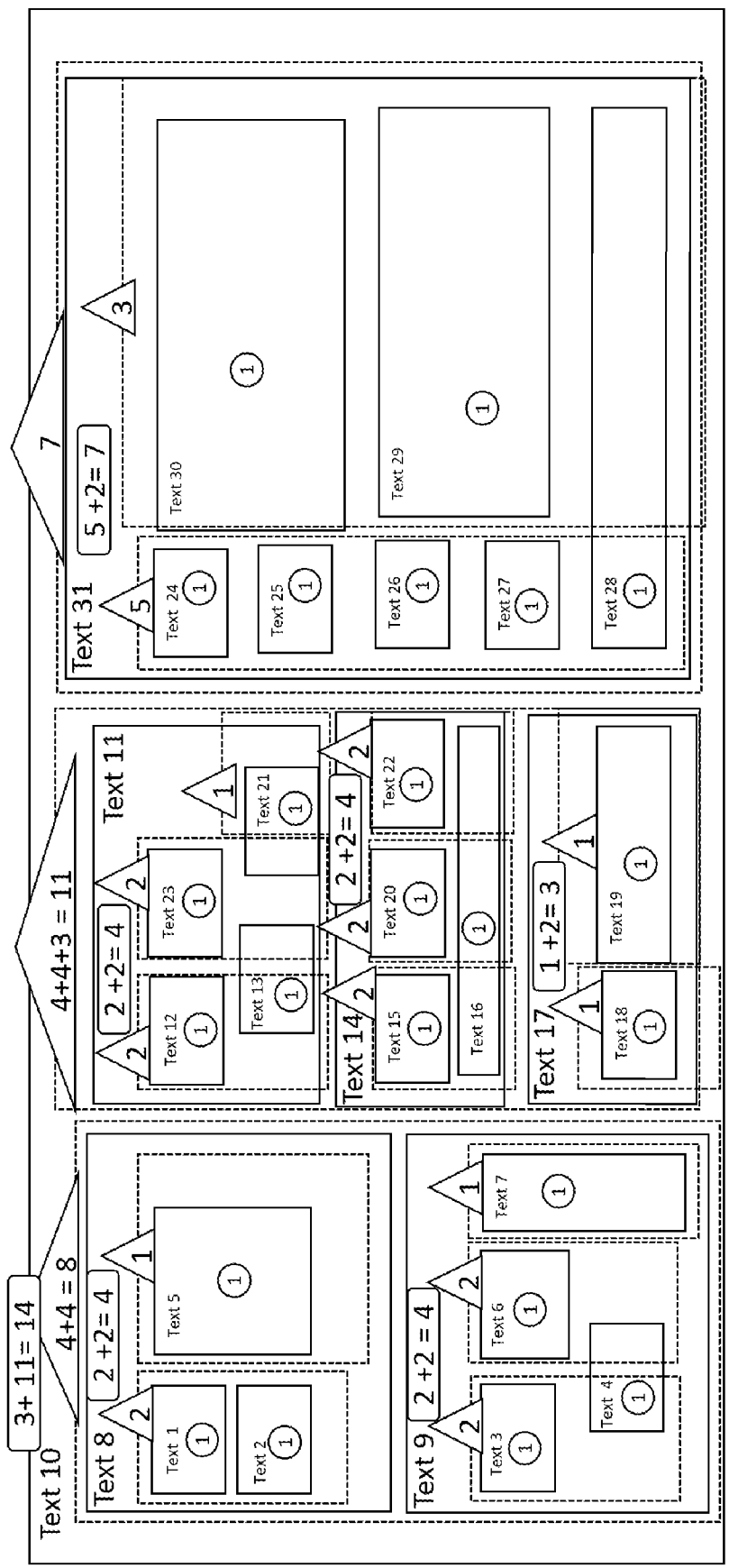

Furthermore, the FFSR-related y-delta determination for process level 3, Text 10 container is illustrated in FIG. 4E, which is a function of the FFSR (11') for its tallest stack 60 (comprising Text 11, Text 14, and Text 17 containers) plus the IFSR for the intrinsic high-value text element ("Text 10"), in this example '3'. Thus, the FFSR for Text 10 container is '11'+'3'='14'. At block 240 the valued object is vertically (but not horizontally) stretched in the pre-processing of the present invention by FFSR. For instance, if Text 8 container has a native width $8W_{100}$ of 30 units and a native height $8H_{100}$ of 40 units prior to the second pass; then after block 240, Text 8 container may be vertically stretched to height $8H_{240}$ of 44 units. Again, the native width does not change: $8W_{100}=8W_{240}=30$ units.

In short, the graphic elements (in the above-mentioned figures, rectangular graphic data objects) may be linearly resized on a respective process level of a nesting of process levels as a function of a sum of text element adjustments at successively inner process levels of the nesting of process levels, wherein each text element adjustment is adjusted as a function of the respective process level relative to a hierarchy of the nesting of process levels, wherein each visual element has a zoomable data set comprising: a container height, a container width, and a container center, wherein linearity is consistently associated with the container height or the container width of the respective visual element, wherein each sum of text element adjustments is a function of one or more stack reserves, and wherein each stack reserve is defined by a stack of linear graphic elements on a respective process level.

The second pass component proceeds to block 250, at which a query is made as to determine if the $8H_{240}$ is associated with the tallest vertical stack among all the stacks in the instant valued object (determined at block 210; i.e., whether Text 8 container is part of the tallest stacks of process level 3, the Text 10 container).

If the answer to the query at block 250 is affirmative for the container in question, then its second pass y-delta is unchanged during this portion of the pre-processing: e.g., for Text 11 container (which is part of the tallest stack 60 bounded by the process level 3 Text 10 container) $11H_{250}=11H_{240}$. Put another way, the linear resizing of each graphic element, at each respective process level, is a function of a largest stack reserve of the one or more stack reserves of an immediately outer process level.

If the answer to query at block 250 is negative, then the second pass pre-processing moves to block 260, wherein the second pass y-delta for container in question is adjusted by a scaling factor. For instance, if Text 8 container is in a stack that is not the tallest stack, then $8H_{260}=8H_{240}+$scaling factor. The scaling factor results in further vertical stretching to facilitate maintaining the contextual meaning to the organized whole of the sum of the containers (or other diagrams) of the original document. In the context of the second pass pre-processing, this portion may be referred to as "reserve scaling".

Figure 5A:
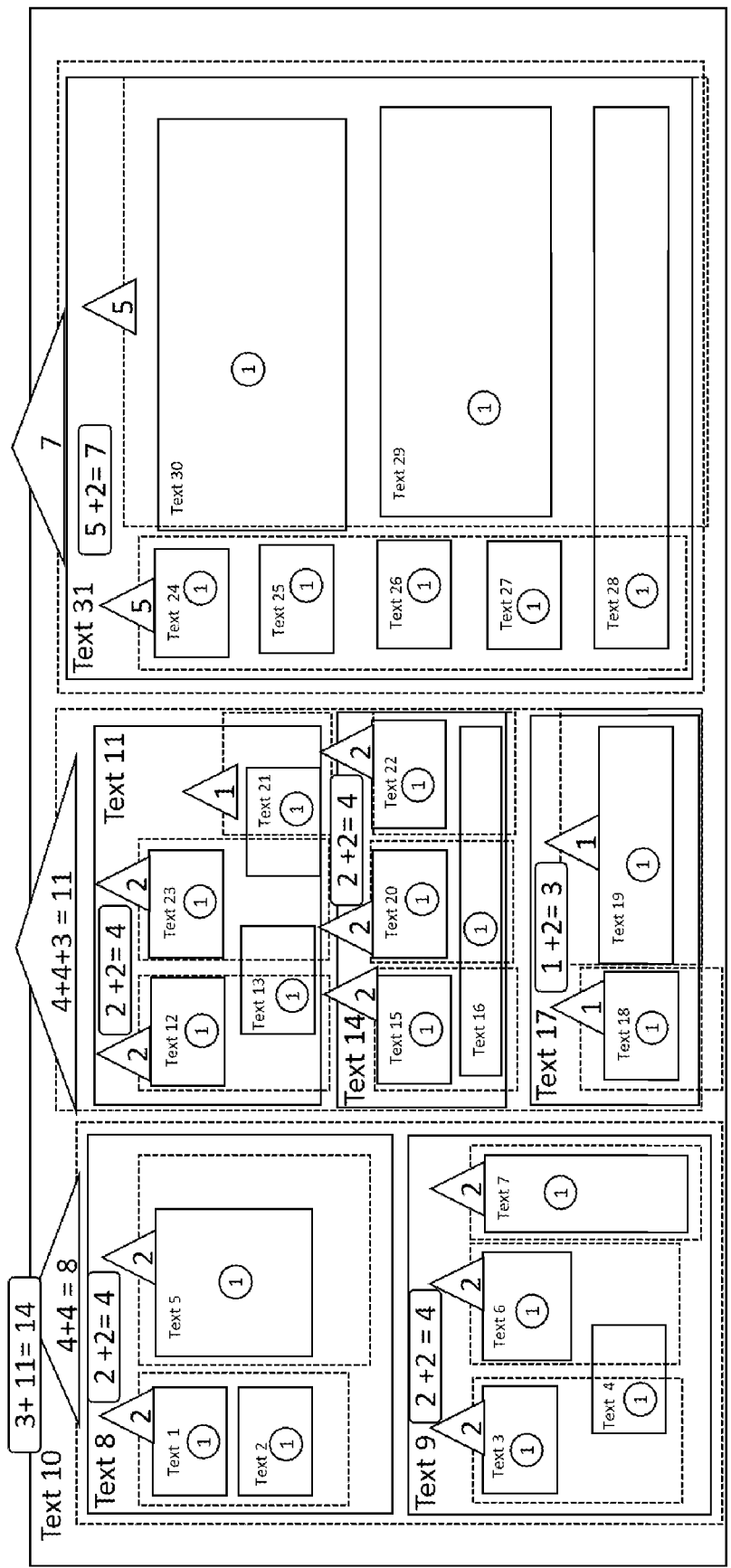
FIGS. 5A through 5C are schematic views of the pre-processing determination of distribution of adjusted height among contained, high-value objects.
Figure 5B:
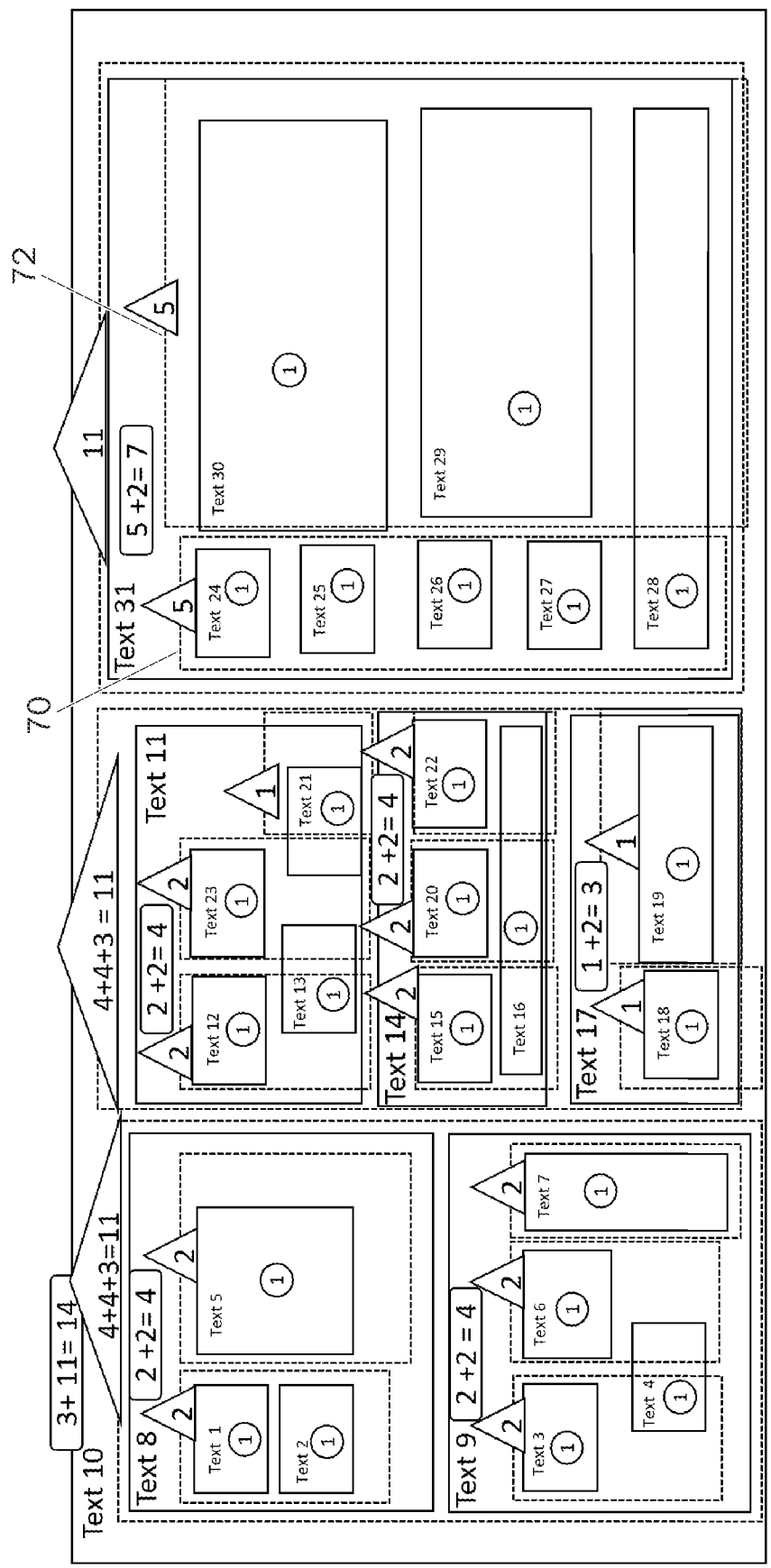
Figure 5C:
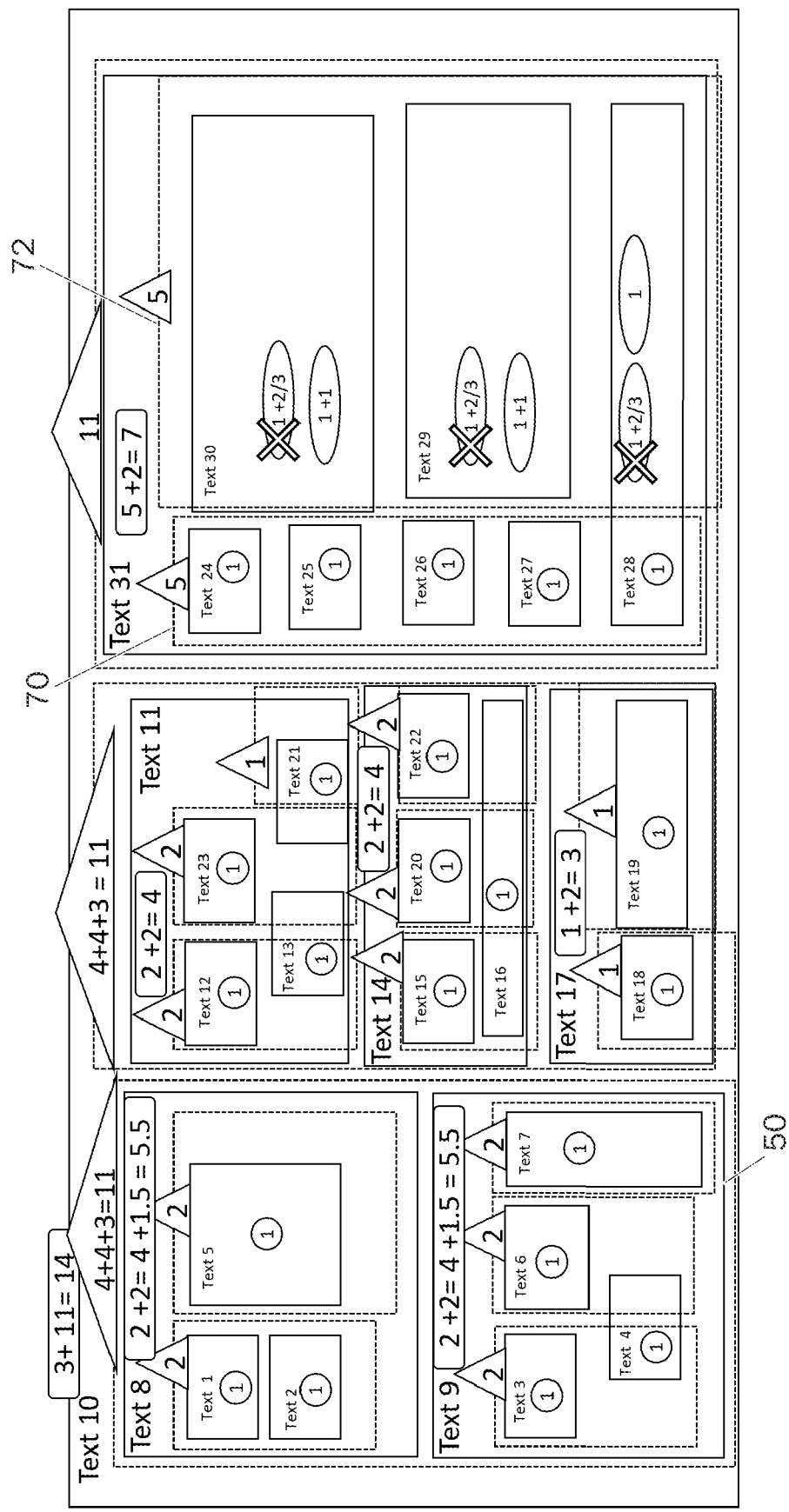

FIGS. 5A through 5C, illustrate determination and application of this scaling factor/reserve scaling. For instance, here, the stack 50 comprising the Text 8 and Text 9 containers, not being the tallest stack, is subject to reserve scaling. The scaling factor/reserve scaling is a function of a reserve difference between the FFSRs of the non-tallest stack 50 and the tallest stack 60 (of the same process level). Importantly this reserve scaling is applied in an 'outside-to-in' manner. This means that the scaling factor results from dividing said reserve difference by the number of containers of the stack, as illustrated in FIG. 5C. Thus, the reserve difference of '3' is divided evenly/proportionally among the two Text 8 and Text 9 containers, or in other words, a '1.5' scaling factor is applied to each of the Text 8 and Text 9 containers: $8H_{260}=8H_{240}+1.5$. Therefore, the second pass y-delta is native y-delta+FFSR+scaling factor. In other words, the method embodied in the present invention contemplates proportional resizing of each graphic element within each stack as a function of a difference between the largest stack reserve and the stack reserve associated with said stack.

Equally important, the set of rules for the present invention limits the application of the scaling factor to one per container. Specifically, for a container that is share between two or more stacks, that container receives only the scaling factor of the tallest stack (for the sharing stacks. Therefore, in the two stacks 70 and 72 bounded by the Text 31 container, FIG. 5C illustrates how the '⅔' "units" scaling factor (associated with the right-most stack 72) that would have otherwise been applied to Text 28 container, is not so applied, but rather this '⅔' scaling factor is divided equally/proportionally (here, twice) by the remaining (non-shared) containers of the rightmost stack 72—i.e., Text 30 and Text 29 containers.

The Third Pass Pre-Processing Component

The non-proportional zoom method proceeds to the third pass component 300, aiming to preserve the contextual meaning to the organized whole of the sum of the containers (or other objects) of the original document, wherein each contained object (of the second pass 200) may be subject to a vertical shift. The vertical shift is applied based on a shift center-y approach, wherein half of the vertical shift is applied to the top-most edge of the container in question, which is stretched upward relative to its own midpoint, wherein the remaining half of the vertical shift is applied to the bottom most edge of said container, which is stretched downward by the other half relative to said midpoint, and wherein The midpoint, or center-y, may be shifted vertically by the same half. The vertical shift is applied through a top-to-bottom manner.

At block 310, a query determines whether such contained object is part of the tallest stack (see blocks 220-260).

If the answer to the query at block 310 is affirmative (and thus the stack in question is the tallest stack), then the third pass process moves to block 320, wherein a determination is made regarding whether such contained object is the first object in the tallest stack.

If the answer to the query at block 320 is affirmative the vertical shift of such object is proportional to the top of the containing object pursuant block 322.

Figure 6A:
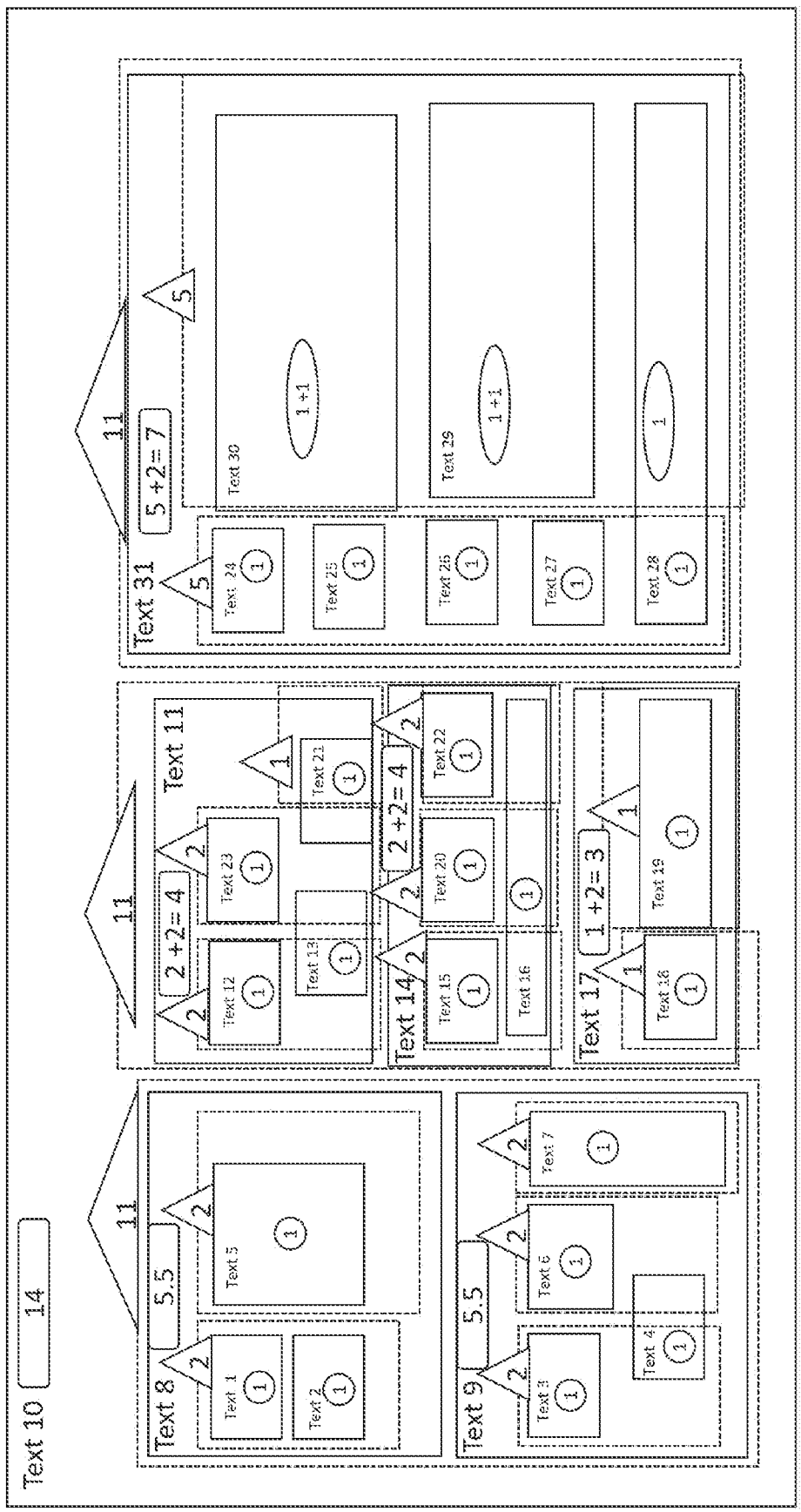
FIGS. 6A through 6M are schematic views of the pre-processing change in the center-y position of valued objects based on the height changes of FIGS. 5A through 5C.

If the answer to the query at block 320 is negative the vertical shift of such object is proportional to the object above it in the stack pursuant block 324. FIG. 6A illustrates the top-to-bottom manner of the vertical shift under step 322, addressing the vertical shift of the tallest stack. First, for the outermost "top" container (Text 10) the present invention provides a FFSR of '14' as determined in FIG. 4E (block 240 or 260). According to the center-y approach, the upper-most edge of Text 10 container is shifted by $FFSR_{10}$ ('14'), and its center-y midpoint is increase by half of $FFSR_{10}$ ('7'), thereby, in embodiments where the coordinate system establishes the lower left as (0,0), the bottom-most edge of Text 10 container does not shift. It should also be understood that due to rounding of significant digits container edges may vertically shift slightly when mathematically there should be not shift.

Figure 6B:
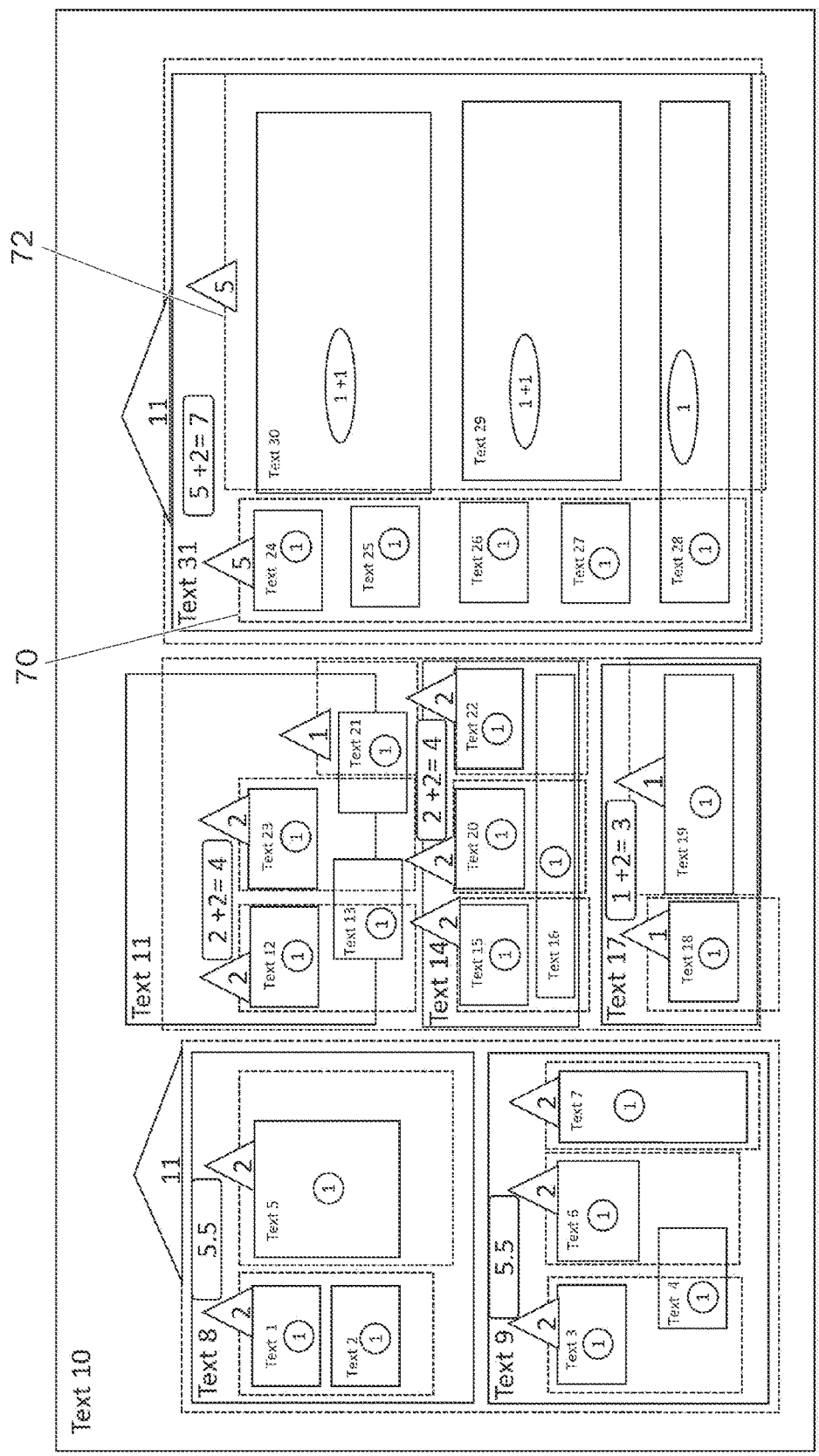

Referring to FIG. 6B, the top-to-bottom approach turns its focus on the vertical shift of the Text 11 container as it is immediately below the top-most container 10 handled in FIG. 6A. Since the Text 11 container is the top of the (process level 2) tallest stack the center-y vertical shift proceeds as follows. First, reference is made to the immediate outer (or one higher) process level—here the process level 3, Text 10 container. From here, the center-y vertical shift of the Text 10 container's midpoint (center-y) may be derived through the following equation:

new Text 11 $y=$new Text 10 $y-$new height (text 10)/
2+new height (Text 11)/2+$Offset_{11}$.
$Offset_{11}=$native Text 11 $y-$native Text 11 height/
2−(native Text 10 $y-$native Text 10 height/2).

Figure 6C:
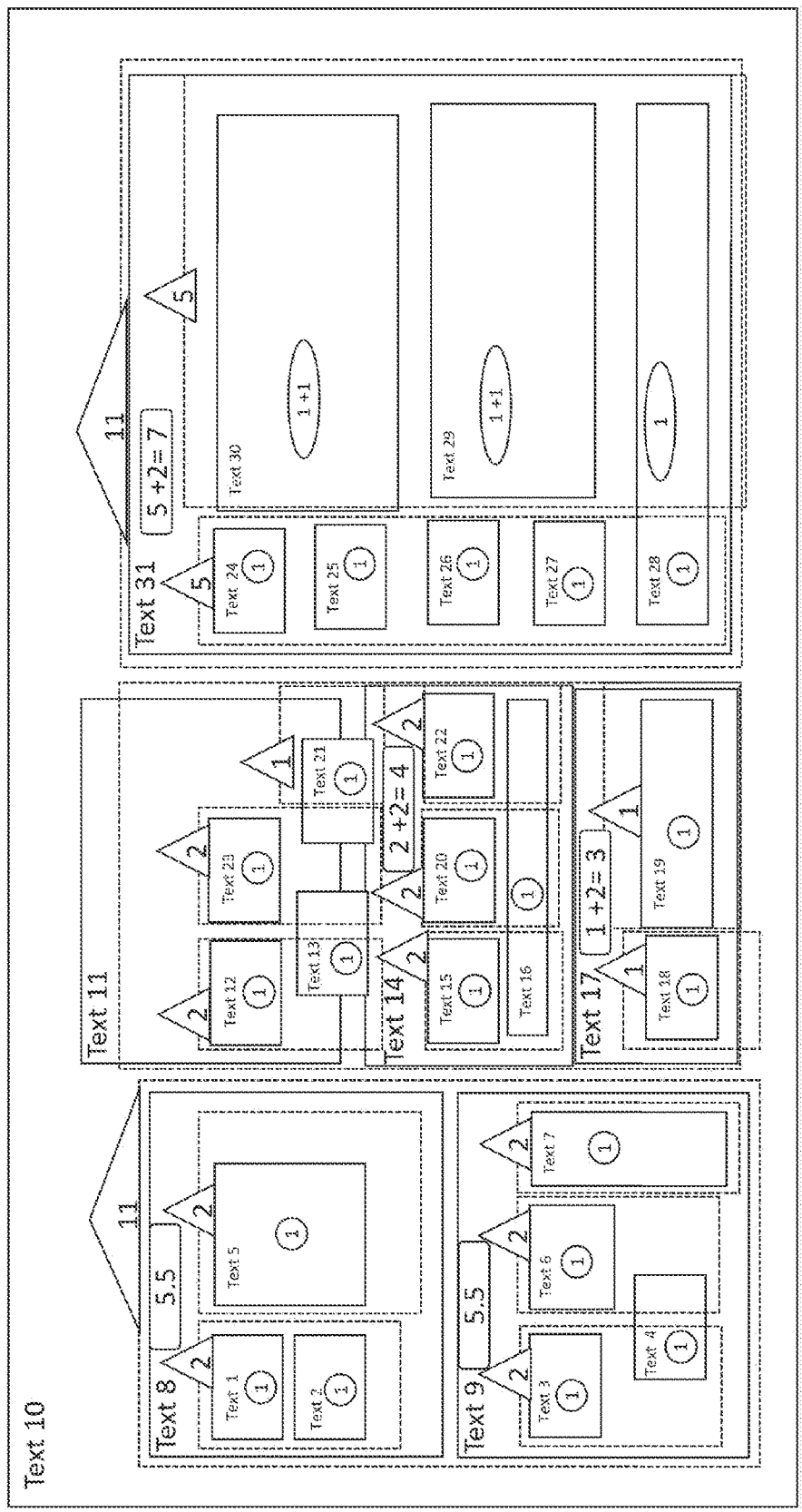
Figure 6D:
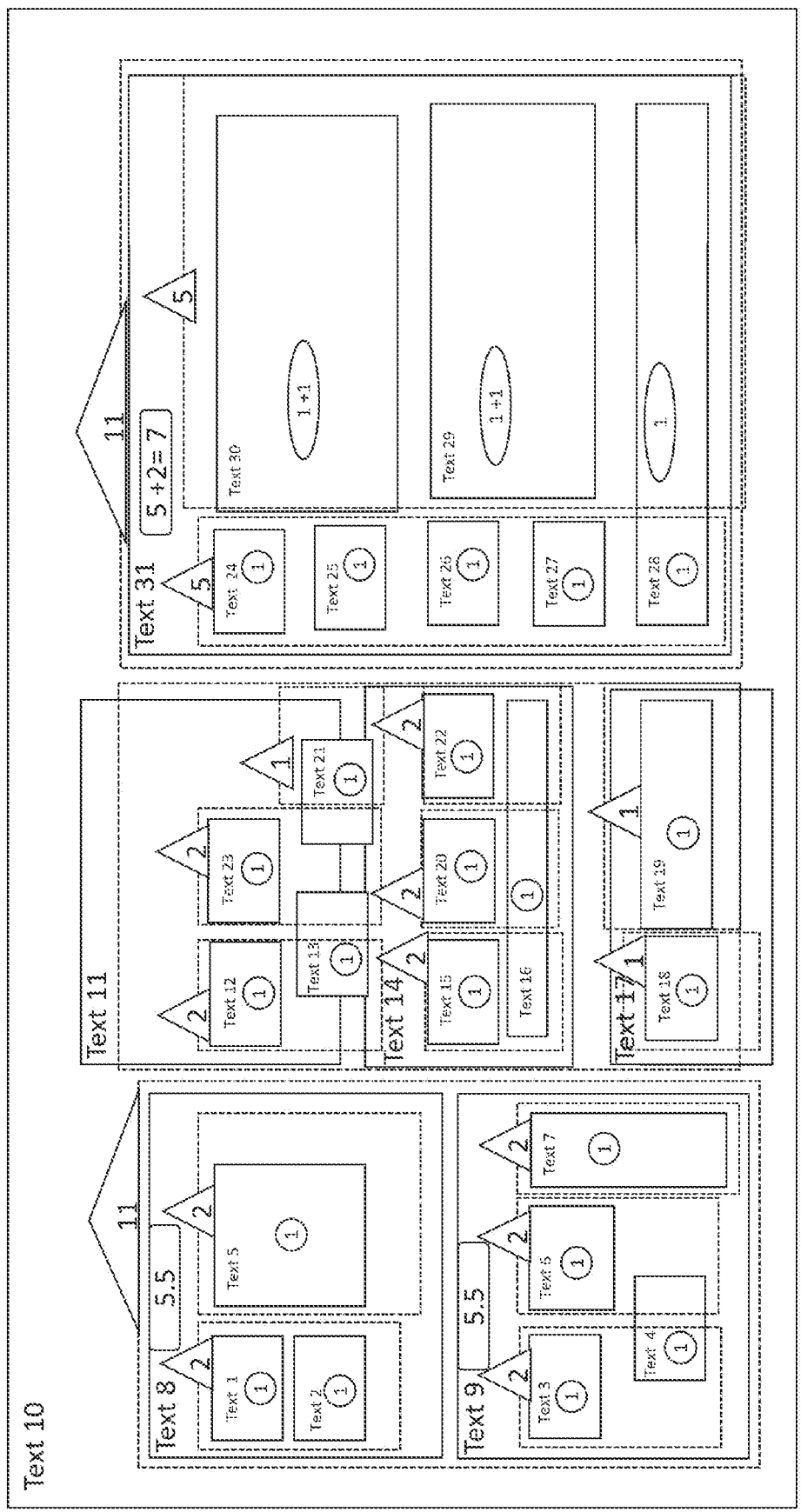

Referring to FIG. 6C, the top-to-bottom approach under block 324 turns its focuses on the vertical shift for Text 14 container, which is immediately below the Text 11 container. The vertical shift determines the change in y position of Text 14 container based on the height changes:

new Text 14 $y=$new Text 11 $y+$new Text11 height/2+
new Text14 height/2+$Offset_{14}$.

$Offset_{14}=$native Text 14 $y-$native Text 14 height/2−
(native Text 11 $y+$old Text 11 height/2)

new Text 17 $y=$new Text 14 $y+$new Text 14 height/
2+new Text 17 height/2+$Offset_{17}$.

$Offset_{17}=$native text 17 $y-$native Text 17 height/2−
(native Text 14 $y+$native Text 14 height/2)

Referring back to FIG. 1, if the answer to the query at block 310 is negative (and thus the stack in question is not the tallest stack), then the third pass pre-process moves to block 330 wherein the vertical shift is applied to maintain the original relationship to an adjacent object on the tallest stack. By 'adjacent,' or 'horizontal adjacency' it is understood that the stack in question need not be immediately adjacent to the tallest stack, as long as the stacks in question are bounded by the same container (and thus on the same process level).

Figure 6E:
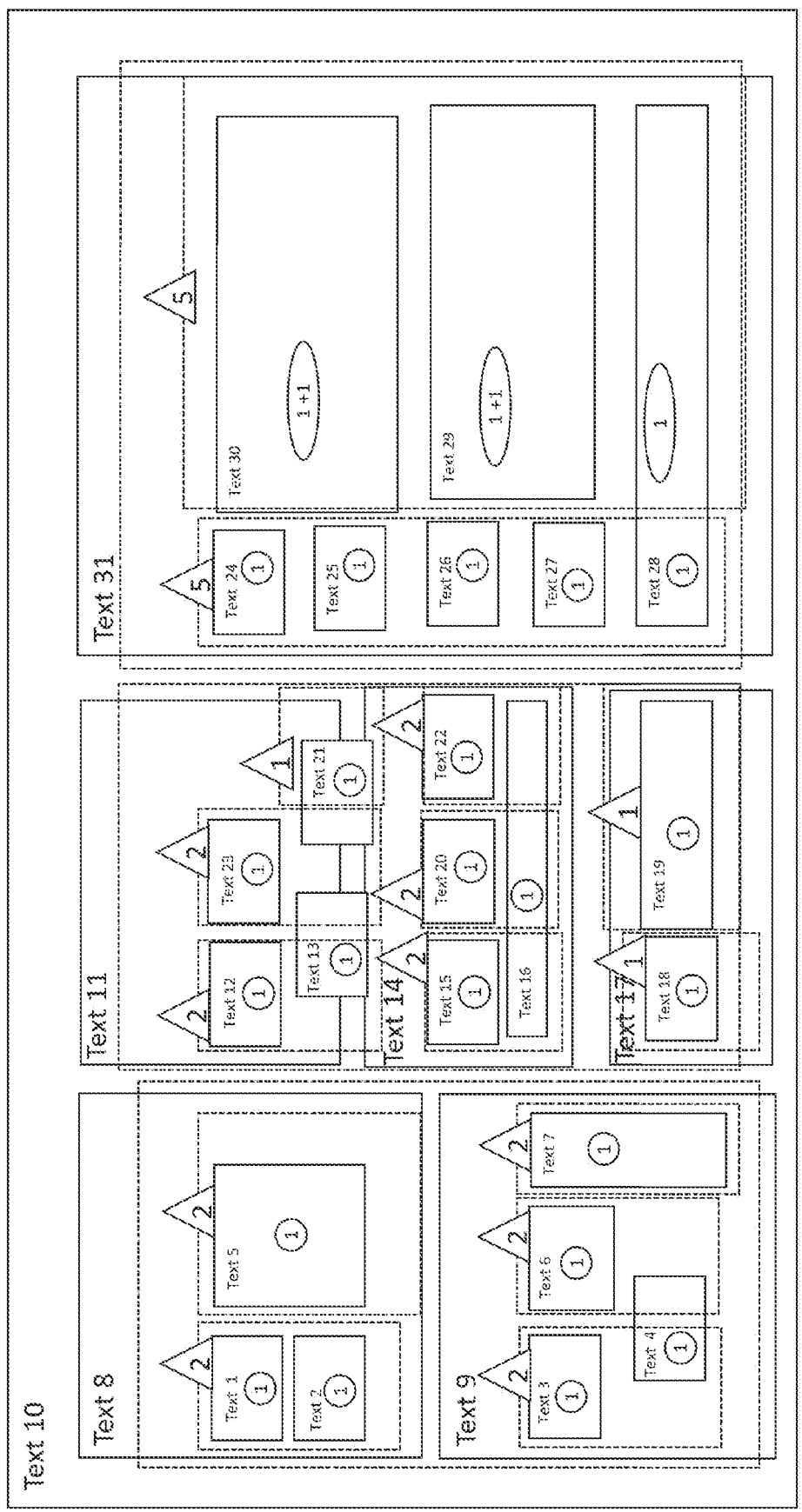

Referring to FIG. 6E, the top-to-bottom approach turns its focuses on the vertical shift for the Text 31 container, which is the top container in this non-tallest stack _____. The vertical shift determines the change in y position of Text 31 container based on the height changes in the container in the adjacent tallest stack _____ —here Text 11 container. This "side-by-side" case uses the following formula:

new Text 31 $y$=new Text 11 $y$–new Text 11 height/2+new Text 31 height/2–Offset$_{31}$.

Offset$_{31}$=native Text 11$y$–native Text 11 height/2–(native Text 31 $y$–native Text 31 height/2)

Figure 6F:
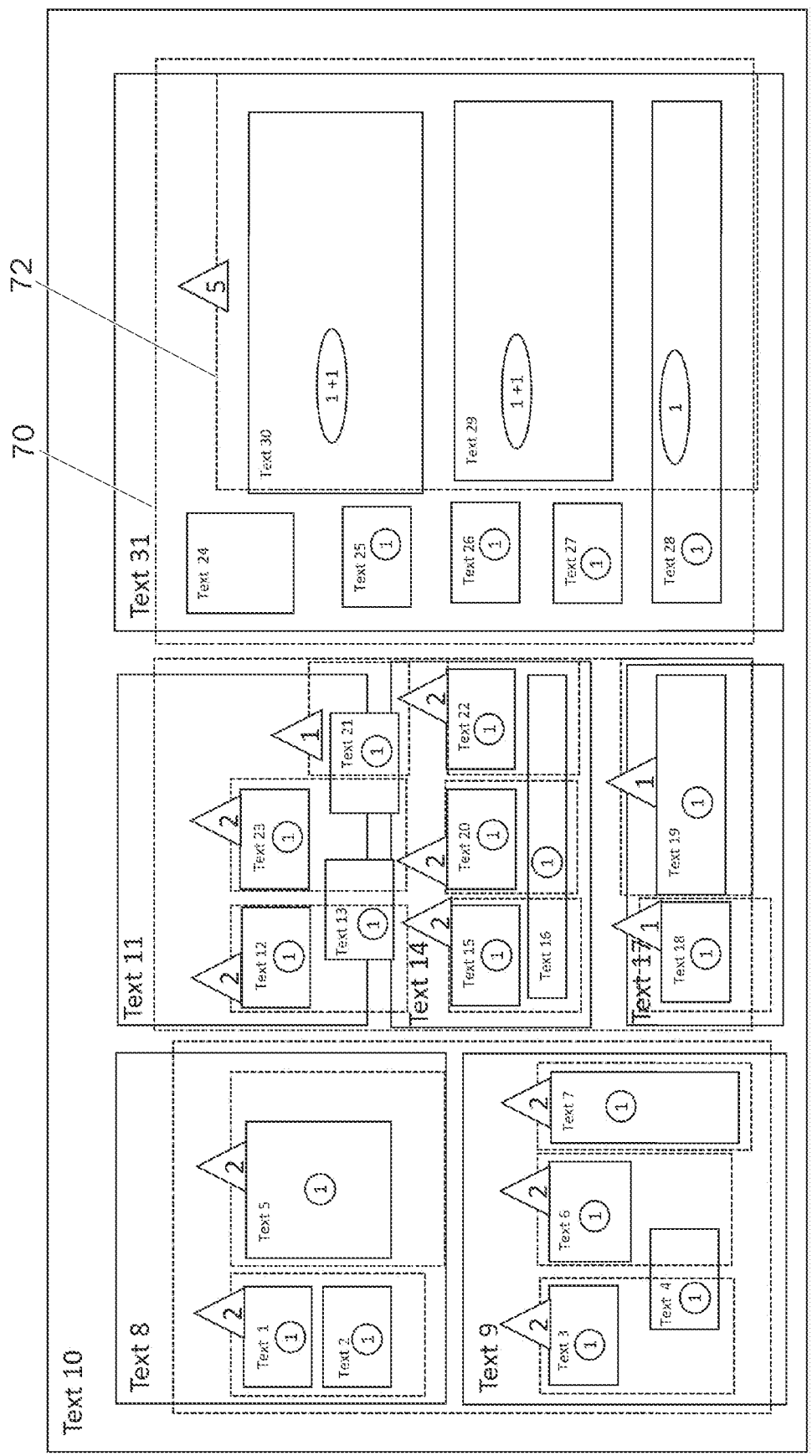

Referring to FIG. 6F, the top-to-bottom approach turns its focuses to the vertical shift for the Text 24 container, which is the top container in the tallest stack 70 of the immediately inner (in process level) stack. The vertical shift determines the change in y position of Text 24 container is based on the height changes of the immediately above container—here Text 31 container (again following the vertical shift paradigm associated with the tallest stack provided above). This case provides that the new Text 24 $y$ is as follows:

new Text 24 $y$=new text 31 $y$–new height (Text 31)/2+new height (Text 24)/2+Offset$_{24}$ Offset$_{24}$=old Text 24 $y$–old Text 24 Height/2–(old Text 31 $y$–old Text 31 height/2).

Figure 6G:
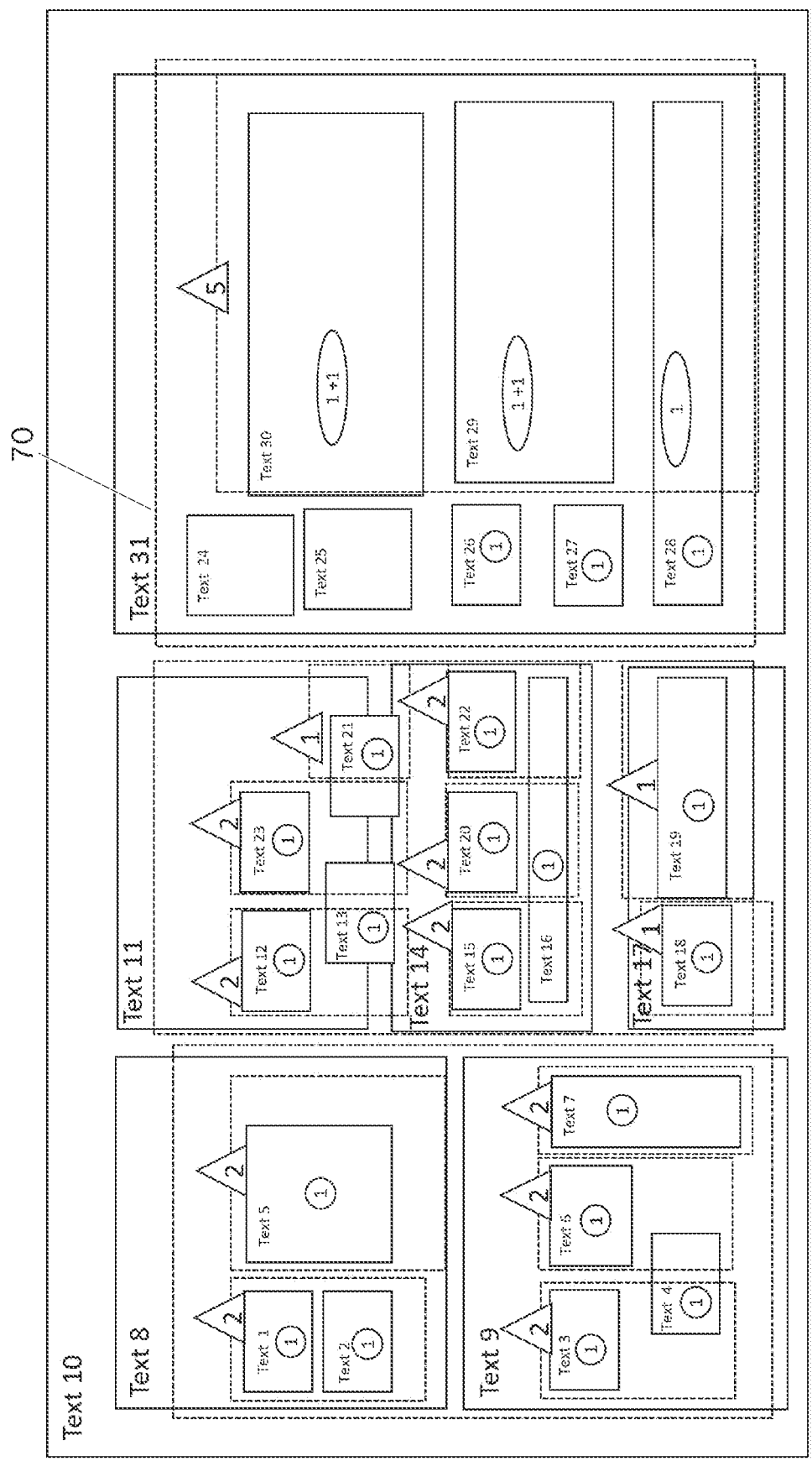
Figure 6H:
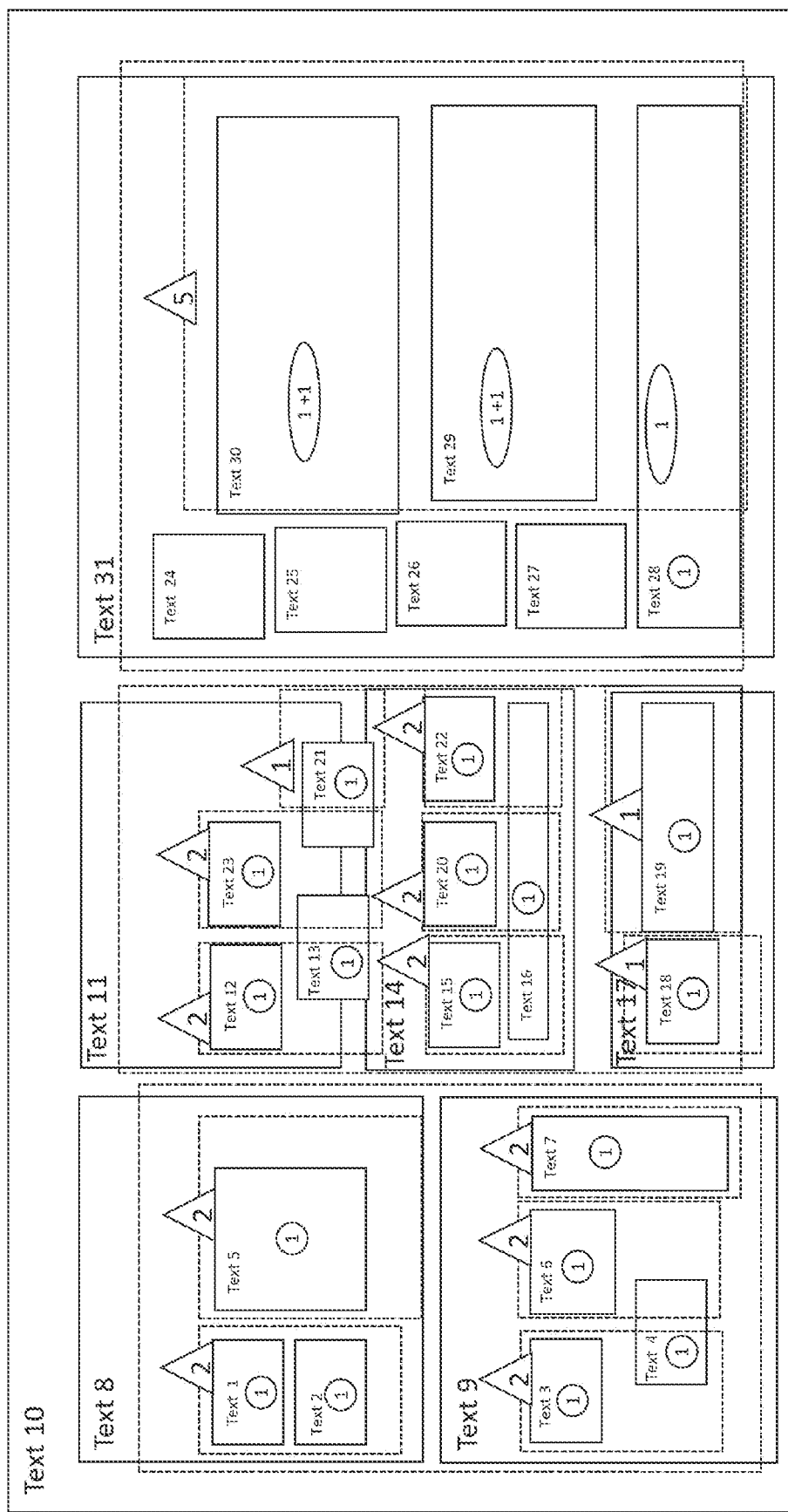
Figure 6I:
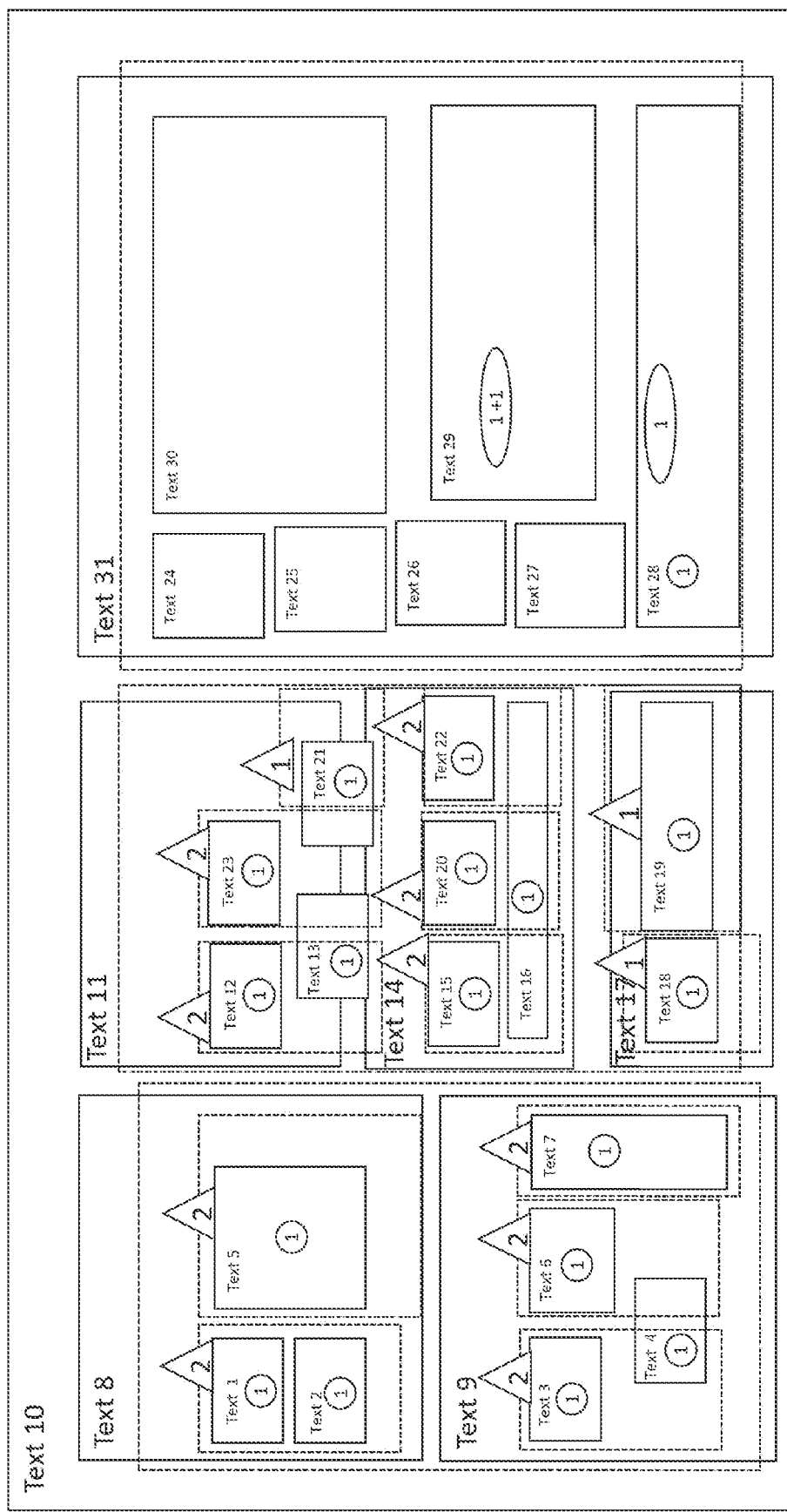
Figure 6J:
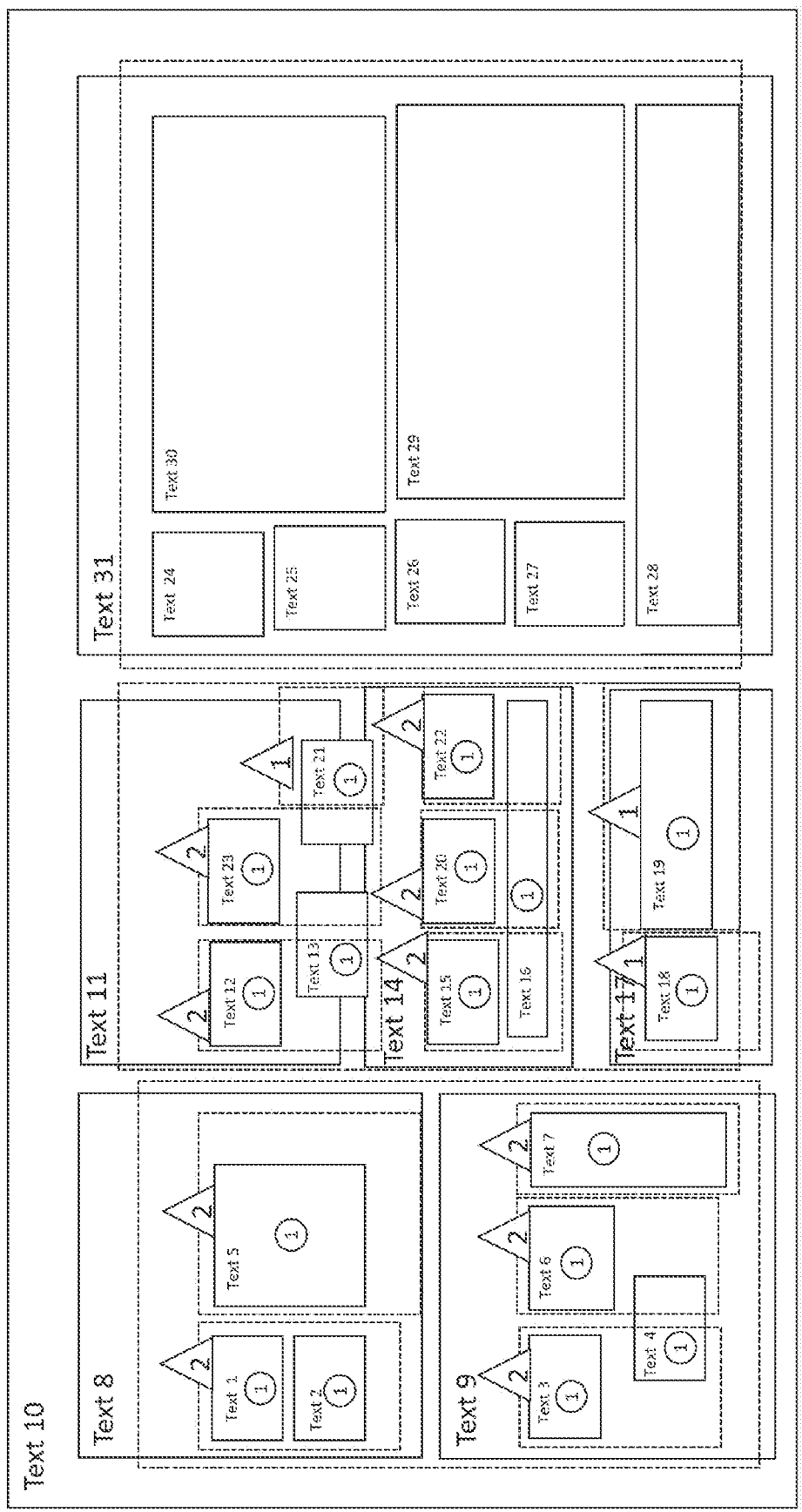
Figure 6K:
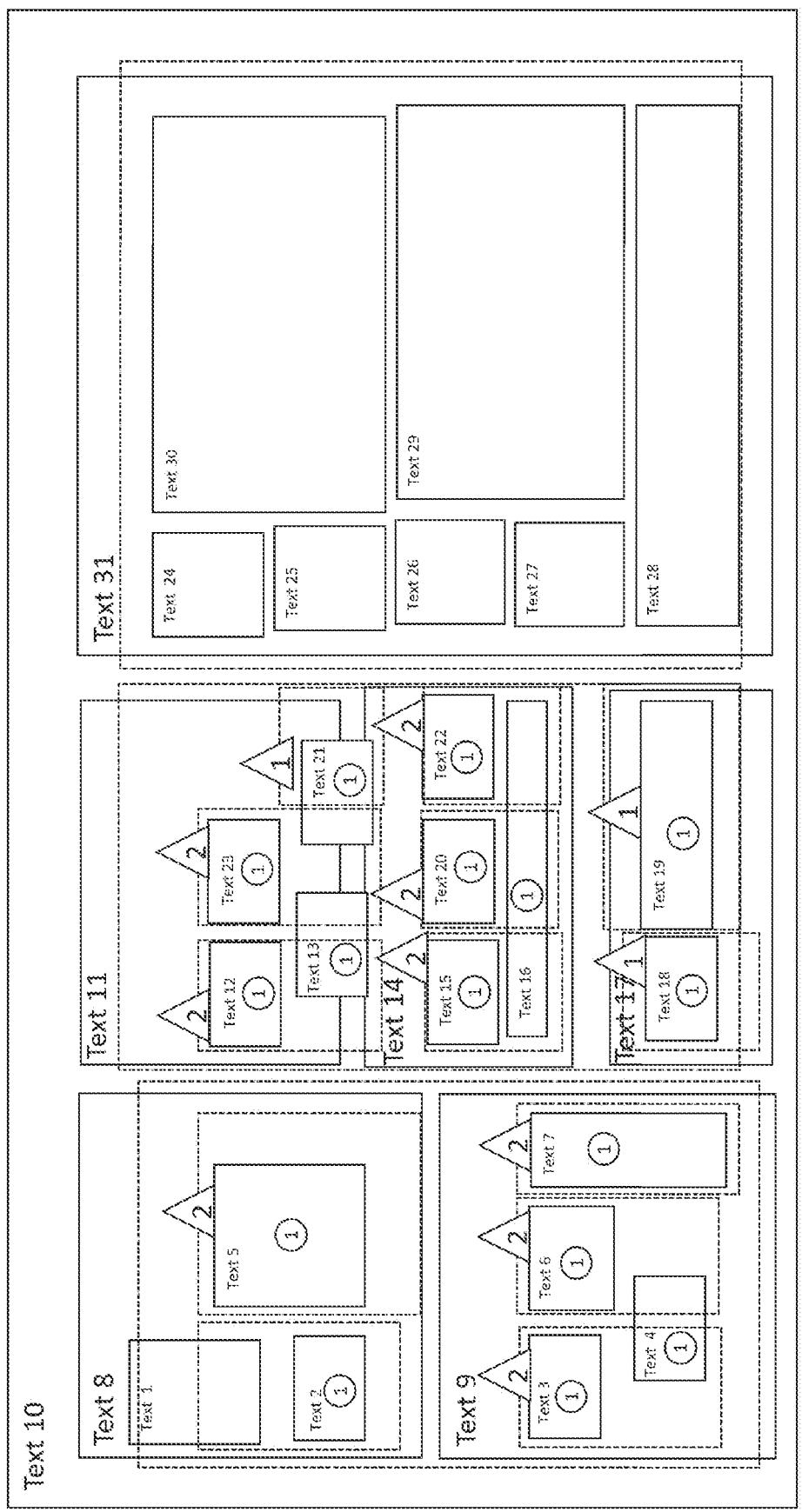
Figure 6L:
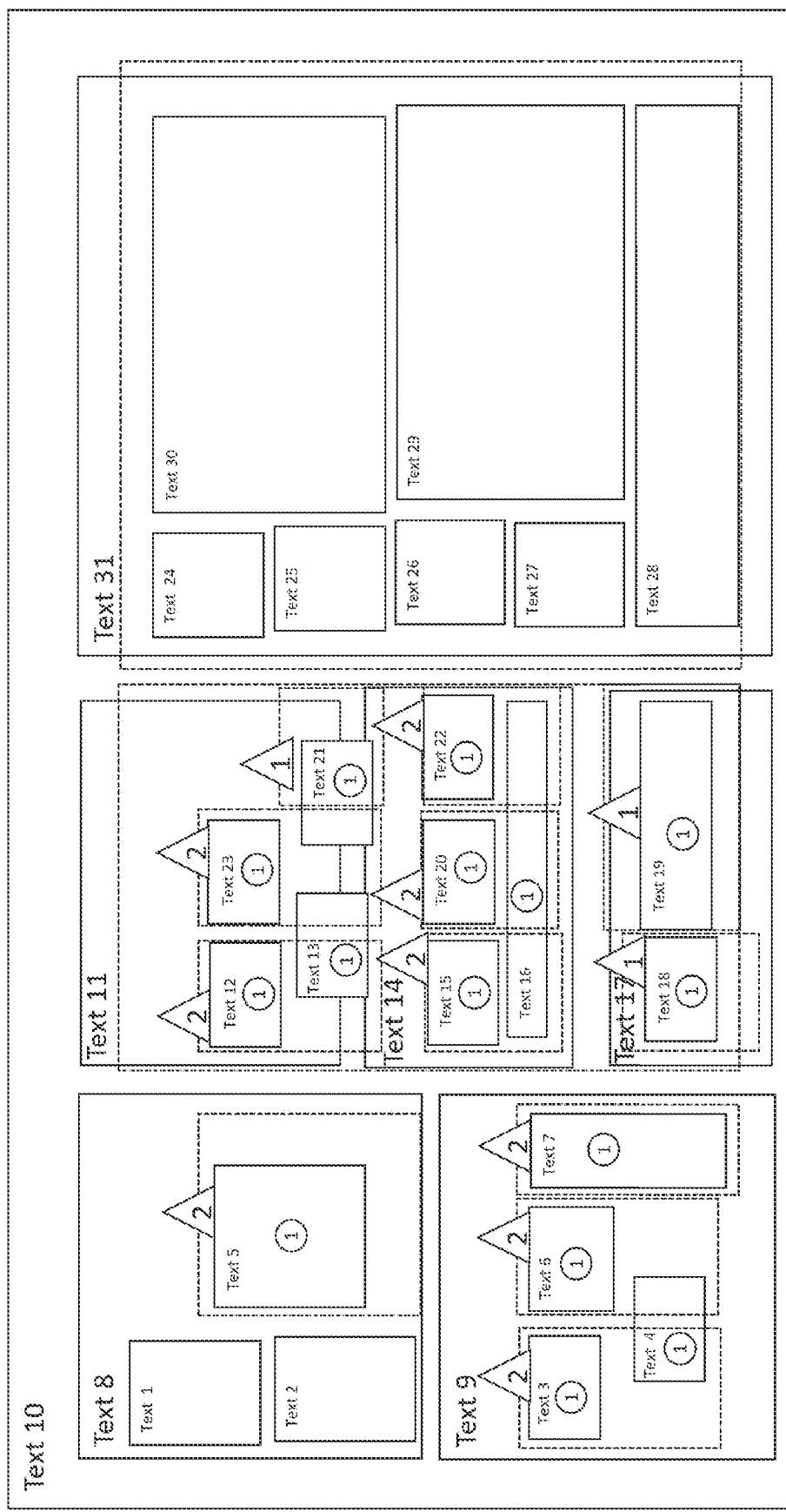
Figure 6M:
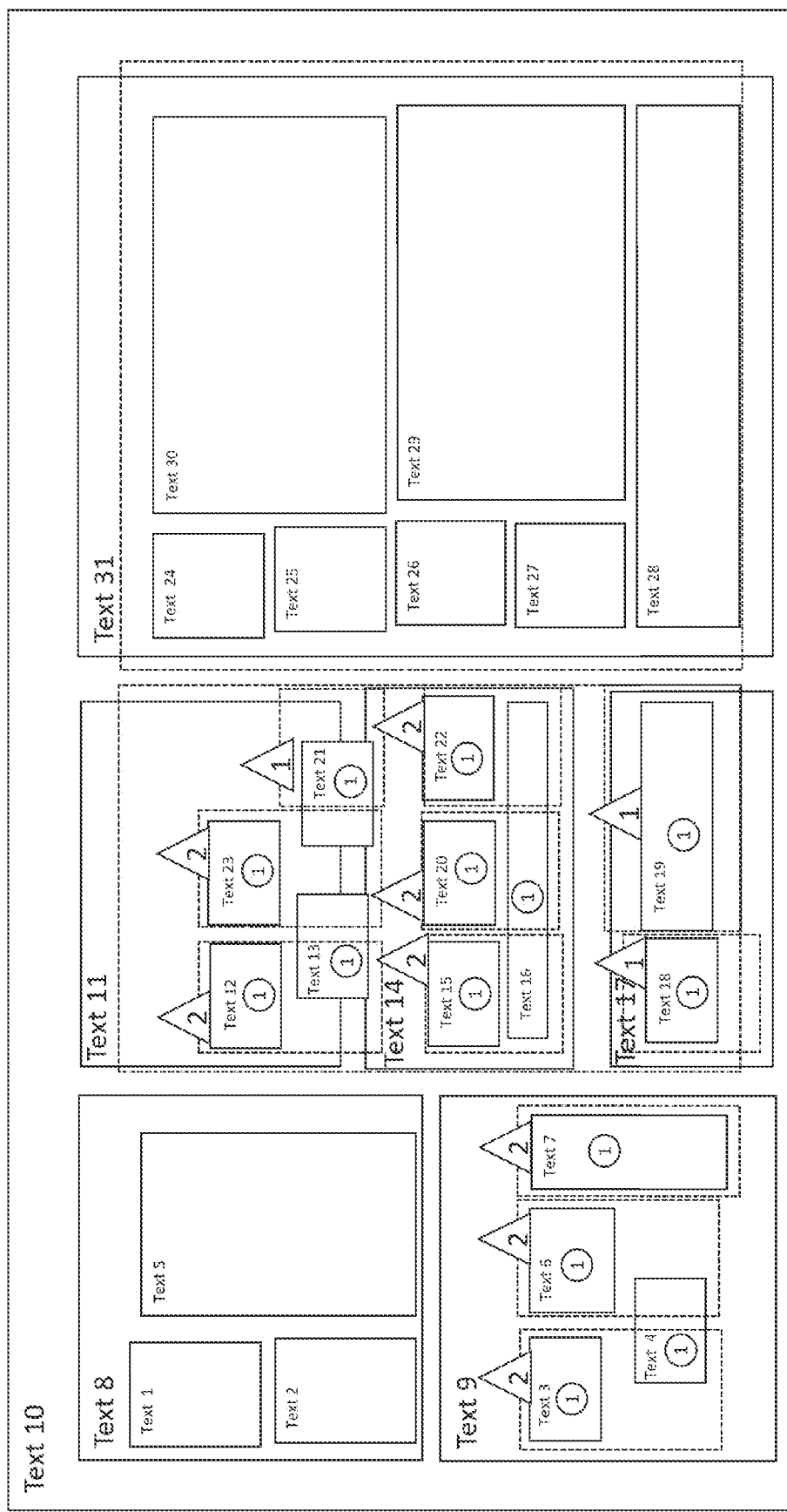

Referring to FIGS. 6G and 6H, a similar top-to-bottom manner is applied to the containers bounded by the tallest stack 70 of Text 31 container. After which, Text 30 container is adjusted according to the side-by-side case, as disclosed in FIG. 6I. This process is repeated as illustrated in FIGS. 6J through 6M.

In general, there are three (3) different top-to-bottom vertical shifts:
(1) Top-most Object of the Tallest Stack (see FIGS. 6B and 6F), wherein the vertical shift is a function of the outermost container—i.e., at each process level, for the most linearly advanced graphic element associated with the largest stack reserve may be linearly shifted as a function of an immediately outer processing level;
(2) Non-Top-most Object of the Tallest Stack (see FIGS. 6C, 6D, and 6G-6H), wherein the vertical shift is a function of the object immediately above—i.e., at each process level, the remaining graphic elements associated with the largest stack reserve may be linearly shifted as a function of an immediately linearly advanced graphic element; and
(3) Objects of Non-Tallest Stack (see FIGS. 6I-6J), wherein the vertical shift is a function of a horizontally adjacent object of the Tallest Stack—i.e., at each process level, the graphic elements associated with a stack reserve less than the largest stack reserve may be linearly shifted as a function of a linear adjacency.

The present invention pre-processing methodology is also tasked with adjusting all non-high value items, wherein the new y of the non-value items=old y of non-value items+(container new y–container old y), whereby all position changes are propagated to lower-value items contained within each valued item.

The resulting document contains and has stored therein the center-y values for all the objects contained therein. Moreover, the object's original/native size, original/native font size and native position information, center-y values, non-proportional zoomed height, font size and position information can be stored with each respective object of the document. Thus, this non-provisional zoom data is retrievable by a server. As a result, the resulting document is configured to switch between native zoom and one of a plurality of non-proportional zoom views of the document.

In some embodiments, the ZUI provides a preview of a resized version of the visual display, i.e., resized according to the rendering layers, process layers and non-proportional zoomable data set using the pre-existing resizing rules of the ZUI. For instance, the ZUI responds to a resizing request by accessing the process layers and non-proportional zoomable data set and rendering a resized version of the visual display based upon the non-proportional zoomable data set and the request.

The server and/or the computer of the present invention may each include computing systems. This disclosure contemplates any suitable number of computing systems. This disclosure contemplates the computing system taking any suitable physical form. As example and not by way of limitation, the computing system may be a virtual machine (VM), an embedded computing system, a system-on-chip (SOC), a single-board computing system (SBC) (e.g., a computer-on-module (COM) or system-on-module (SOM)), a desktop computing system, a laptop or notebook computing system, a smart phone, an interactive kiosk, a mainframe, a mesh of computing systems, a server, an application server, or a combination of two or more of these. Where appropriate, the computing systems may include one or more computing systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing systems may perform at different times or at different locations one or more steps of one or more methods described or illustrated herein, where appropriate.

In some embodiments, the computing systems may execute any suitable operating system such as IBM's zSeries/Operating System (z/OS), MS-DOS, PC-DOS, MAC-OS, WINDOWS, UNIX, OpenVMS, an operating system based on LINUX, or any other appropriate operating system, including future operating systems. In some embodiments, the computing systems may be a web server running web server applications such as Apache, Microsoft's Internet Information Server™, and the like.

In particular embodiments, the computing systems includes a processor, a memory, a user interface and a communication interface. A communication interface may couple the processor 605 to the other components and interfaces included in a client device. The communication interface can be configured to permit unidirectional and/or bidirectional communication between the components and interfaces. For example, the processor can retrieve information from and transmit information to the storage device over the communication interface/bus. In an implementation, the communication interface can be comprised of a plurality of busses, each of which couples at least one component or interface of the client device with another component or interface. This information may include set of one or more data files specifying a zoomable data set and storing one of a different non-proportional zoomable data sets for different visual elements of the plurality of visual elements, wherein the non-proportional zoomable data set refines the zoomable data set.

In particular embodiments, the processor includes hardware for executing instructions, such as those making up a computer program. The memory includes main memory for storing instructions such as computer program(s) for the processor to execute, or data for processor to operate on. The memory may include mass storage for data and instructions such as the computer program. As an example and not by way of limitation, the memory may include an HDD, a floppy disk drive, flash memory, an optical disc, a magneto-optical disc, magnetic tape, a Universal Serial Bus (USB) drive, a solid-state drive (SSD), or a combination of two or more of these. The memory may include removable or non-removable (or fixed) media, where appropriate. The memory may be internal or external to computing system, where appropriate. In particular embodiments, the memory is non-volatile, solid-state memory.

The user interface includes hardware, software, or both providing one or more interfaces for communication between a person and the computer systems. As an example and not by way of limitation, an user interface device may include a keyboard, keypad, microphone, monitor, mouse, printer, scanner, speaker, still camera, stylus, tablet, touchscreen, trackball, video camera, another suitable user interface or a combination of two or more of these. A user interface may include one or more sensors. This disclosure contemplates any suitable user interface and any suitable user interfaces for them, currently available or subsequent developed.

The communication interface includes hardware, software, or both providing one or more interfaces for communication (e.g., packet-based communication) between the computing systems over the network. As an example and not by way of limitation, the communication interface may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface. As an example and not by way of limitation, the computing systems may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the computing systems may communicate with a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination of two or more of these. The computing systems may include any suitable communication interface for any of these networks, where appropriate.

It should be understood, of course, that the foregoing relates to exemplary embodiments of the invention and that modifications may be made without departing from the spirit and scope of the invention as set forth in the following claims.

What is claimed is:

1. A computer implemented method of processing a visual display containing a nesting of process levels including a first process level and a second process level, wherein the first process level is nested within the second process level, wherein respective process levels contain a plurality of visual elements, wherein each visual element comprises a plurality of graphic elements and a text element for each graphic element, the method comprising:
    calculating a first text element adjustment on the first process level of the nesting of process levels, wherein the first text element adjustment is based at least on a size of at least one of the text elements of the first process level;
    calculating a second text element adjustment on the second process level of the nesting of process levels, wherein the second text adjustment is based on the relative level of the second process level in a hierarchy;
    summing the first and second text adjustments; and
    linearly resizing one or more graphic elements on said second process level as a function of the summation of the first and second of text element adjustments.

2. The method of claim 1, wherein each text element adjustment is adjusted as a function of the respective process level relative to a hierarchy of the nesting of process levels.

3. The method of claim 2, wherein each visual element has a zoomable data set comprising: a container height, a container width, and a container center.

4. The method of claim 3, wherein linearity is associated with the container height or the container width of the respective visual element, but not both.

5. The method of claim 4, wherein each summation of text element adjustments is a function of one or more stacks of linear graphic elements on a respective process level.

6. The method of claim 5, wherein the linear resizing of each graphic element, at each respective process level, is a function of a largest stack of the one or more stacks of an immediately outer process level.

7. The method of claim 6, further proportionally resizing each graphic element within each stack as a function of a difference between the largest stack and the stack reserve associated with said stack.

8. The method of claim 7, further maintaining a native relationship of the visual display through the linear resizing and the proportional resizing of the graphic elements in view of adjacent graphic elements.

9. The method of claim 8, wherein the native relationship is defined, in part, at each process level, by a linear adjacency of each graphic element associated with the largest stack reserve and a graphic element associated with each remaining stack, respectively.

10. The method of claim 9, further linearly shifting, at each process level, a most linearly advanced graphic element associated with the largest stack as a function of an immediately outer processing level.

11. The method of claim 10, further linearly shifting, at each process level, the remaining graphic elements associated with the largest stack as a function of an immediately linearly advanced graphic element.

12. The method of claim 11, further linearly shifting, at each process level, the graphic elements associated with a stack less than the largest stack as a function of the linear adjacency.

13. The method of claim 12, wherein each linear shift of each graphic element is defined by the container center of said graphic element.

14. The method of claim 13, wherein each linear shift is a center-y or center-x shift.

15. The method of claim 14, further accessing a set of one or more data files specifying the zoomable data set; and storing one of a different non-proportional zoomable data sets for different visual elements of the plurality of visual elements, wherein the non-proportional zoomable data set redefines the zoomable data set, respectively.

16. The method of claim 15, wherein each stored non-proportional zoomable data set is stored with each respective visual element.

17. A method of resizing a source document comprising a visual display containing a nesting of process levels, using the method of claim 16, wherein respective process levels contain one or more visual elements, wherein each visual element comprises a graphic element and a text element, the method comprising:
   receiving a request to display, on a display screen, the source document in a zoom representation of the source document;
   generating the zoom representation through accessing the non-proportional zoomable data sets stored in each visual element; and
   displaying the generated zoom representation within the display screen.

18. The method of claim 16, further comprising rendering the visual display on a display screen by modifying each visual element according to the stored non-proportional zoomable data sets.

19. The method of claim 18, wherein each text element comprises a font size, and wherein, for each text element, the text element adjustment comprises an adjustment to said font size.

20. A method of resizing a source document comprising a visual display containing a nesting of process levels, using the method of claim 19, wherein respective process levels contain one or more visual elements, wherein each visual element comprises a graphic element and a text element, the method comprising:
   receiving a request to display, on a display screen, the source document in a zoom representation of the source document;
   generating the zoom representation through accessing the non-proportional zoomable data sets stored in each visual element; and
   displaying the generated zoom representation within the display screen.

21. A computer implemented method of processing a visual display containing a nesting of process levels including a first process level and a second process level, wherein the first process level is nested within the second process level, wherein respective process levels contain a plurality of visual elements, wherein each visual element comprises a plurality of graphic elements and a text element for each graphic element, the method comprising:
   calculating a first text element adjustment on the first process level of the nesting of process levels, wherein the first text element adjustment is based at least on a size of at least one of the text elements of the first process level;
   calculating a second text element adjustment on the second process level of the nesting of process levels, wherein the second text adjustment is based on the relative level of the second process level in a hierarchy;
   summing the first and second text adjustments; and
   incrementally resizing a font size of each text element as a function of the summation of the first and second of text element adjustments.

22. The method of claim 21, wherein each font size resizing is resized as a function of the respective process level relative to a hierarchy of the nesting of process levels.

23. The method of claim 22, wherein each visual element has a zoomable data set comprising a font size.

24. The method of claim 23, wherein each sum of text element adjustments is a function of one or more stack reserves, wherein each stack is defined by a stack of linear graphic elements on a respective process level.

25. The method of claim 24, wherein the zoomable data set further comprising a text element location.

26. The method of claim 25, further linearly shifting, at each process level, the text element location associated with a most linearly advanced graphic element associated with the largest stack as a function of an immediately outer processing level.

27. The method of claim 26, further linearly shifting, at each process level, the text element location associated with the remaining graphic elements associated with the largest stack as a function of an immediately linearly advanced graphic element.

28. The method of claim 27, further linearly shifting, at each process level, the graphic elements associated with a stack less than the largest stack as a function of the linear adjacency.

29. The method of claim 28, further accessing a set of one or more data files specifying the zoomable data set; and storing one of a different non-proportional zoomable data sets for different visual elements of the plurality of visual elements, wherein the non-proportional zoomable data set redefines the zoomable data set, respectively.

30. The method of claim 29, wherein each stored non-proportional zoomable data set is stored with each respective visual element.

31. The method of claim 30, further comprising rendering the visual display on a display screen by modifying each visual element according to the stored non-proportional zoomable data sets.

* * * * *